(12) United States Patent
Glasco

(10) Patent No.: US 7,346,744 B1
(45) Date of Patent: Mar. 18, 2008

(54) METHODS AND APPARATUS FOR MAINTAINING REMOTE CLUSTER STATE INFORMATION

(75) Inventor: David Brian Glasco, Austin, TX (US)

(73) Assignee: Newisys, Inc., Austin, TX (US)

(*) Notice: Subject to any disclaimer, the term of this patent is extended or adjusted under 35 U.S.C. 154(b) by 504 days.

(21) Appl. No.: 10/435,072

(22) Filed: May 9, 2003

Related U.S. Application Data

(63) Continuation-in-part of application No. 10/288,347, filed on Nov. 4, 2002, which is a continuation-in-part of application No. 10/288,399, filed on Nov. 4, 2002.

(51) Int. Cl.
*G06F 12/12* (2006.01)

(52) U.S. Cl. .................. 711/141; 711/120; 709/238

(58) Field of Classification Search ............... 711/141
See application file for complete search history.

(56) References Cited

U.S. PATENT DOCUMENTS

| | | | |
|---|---|---|---|
| 5,195,089 A | 3/1993 | Sindhu et al. | |
| 5,394,555 A | 2/1995 | Hunter et al. | |
| 5,692,123 A | 11/1997 | Logghe | |
| 5,829,032 A | 10/1998 | Komuro et al. | |
| 5,950,226 A * | 9/1999 | Hagersten et al. | 711/124 |
| 6,018,791 A | 1/2000 | Arimilli et al. | |
| 6,038,652 A | 3/2000 | Van Doren et al. | |
| 6,067,603 A | 5/2000 | Carpenter et al. | |
| 6,085,295 A | 7/2000 | Ekanadham et al. | |
| 6,108,737 A | 8/2000 | Sharma et al. | |
| 6,148,378 A | 11/2000 | Bordaz et al. | |
| 6,167,492 A | 12/2000 | Keller et al. | 711/154 |
| 6,189,078 B1 | 2/2001 | Bauman et al. | |
| 6,192,451 B1 | 2/2001 | Arimilli et al. | |
| 6,209,065 B1 | 3/2001 | Van Doren et al. | |
| 6,279,085 B1 * | 8/2001 | Carpenter et al. | 711/143 |
| 6,292,705 B1 | 9/2001 | Wang et al. | |
| 6,292,906 B1 | 9/2001 | Fu et al. | |

(Continued)

FOREIGN PATENT DOCUMENTS

WO    WO 0239242    5/2004

OTHER PUBLICATIONS

*HyperTransport™ I/O Link Specification Revision 1.03*, HyperTransport™ Consortium, Oct. 10, 2001, Copyright © 2001 HyperTransport Technology Consortium.

(Continued)

*Primary Examiner*—Donald Sparks
*Assistant Examiner*—Jesse Diller
(74) *Attorney, Agent, or Firm*—Beyer Weaver LLP

(57) ABSTRACT

According to the present invention, methods and apparatus are provided for increasing the efficiency of data access in a multiple processor, multiple cluster system. Mechanisms for improving the accuracy of information available to a cache coherence controller are provided in order to allow the cache coherence controller to reduce the number of transactions in a multiple cluster system. Non-change probes and augmented non-change probe responses are provided to acquire state information in remote clusters without affecting the state of the probed memory line. Augmented probe responses associated with shared and invalidating probes are provided to update state information in a coherence directory during read and read/write probe requests.

85 Claims, 21 Drawing Sheets

U.S. PATENT DOCUMENTS

| | | | |
|---|---|---|---|
| 6,330,643 B1 | 12/2001 | Arimilli et al. | |
| 6,334,172 B1 | 12/2001 | Arimilli et al. | |
| 6,338,122 B1 | 1/2002 | Baumgartner et al. | |
| 6,385,705 B1 | 5/2002 | Keller et al. | 711/154 |
| 6,405,289 B1 | 6/2002 | Arimilli et al. | |
| 6,463,529 B1 | 10/2002 | Miller et al. | |
| 6,467,007 B1 | 10/2002 | Armstrong et al. | |
| 6,490,661 B1 * | 12/2002 | Keller et al. | 711/150 |
| 6,542,926 B2 | 4/2003 | Zalewski et al. | |
| 6,615,319 B2 | 9/2003 | Khare et al. | |
| 6,631,447 B1 | 10/2003 | Morioka et al. | |
| 6,633,945 B1 | 10/2003 | Fu et al. | |
| 6,633,960 B1 | 10/2003 | Kessler et al. | |
| 6,640,287 B2 | 10/2003 | Gharachorloo et al. | |
| 6,658,526 B2 | 12/2003 | Nguyen et al. | |
| 6,704,842 B1 | 3/2004 | Janakiraman et al. | |
| 6,738,870 B2 | 5/2004 | Van Huben et al. | |
| 6,738,871 B2 | 5/2004 | Van Huben et al. | |
| 6,751,698 B1 | 6/2004 | Deneroff et al. | |
| 6,754,782 B2 | 6/2004 | Arimilli et al. | |
| 6,760,809 B2 | 7/2004 | Arimilli et al. | |
| 6,760,819 B2 | 7/2004 | Arimilli et al. | |
| 6,865,595 B2 | 3/2005 | Glasco | |
| 6,892,282 B2 | 5/2005 | Hass et al. | |
| 6,920,532 B2 * | 7/2005 | Glasco et al. | 711/141 |
| 7,003,633 B2 * | 2/2006 | Glasco | 711/146 |
| 2001/0013089 A1 | 8/2001 | Weber | |
| 2001/0037435 A1 | 11/2001 | Van Doren | |
| 2002/0007463 A1 | 1/2002 | Fung | |
| 2002/0046327 A1 | 4/2002 | Gharachorloo et al. | |
| 2002/0052914 A1 | 5/2002 | Zalewski et al. | |
| 2002/0083243 A1 | 6/2002 | Van Huben | |
| 2002/0087811 A1 | 7/2002 | Khare et al. | |
| 2003/0009623 A1 | 1/2003 | Arimilli et al. | |
| 2003/0182508 A1 | 9/2003 | Glasco | |
| 2003/0182509 A1 | 9/2003 | Glasco | |
| 2003/0182514 A1 | 9/2003 | Glasco | |
| 2003/0195939 A1 | 10/2003 | Edirisooriya et al. | |
| 2003/0196047 A1 | 10/2003 | Kessler et al. | |
| 2003/0210655 A1 | 11/2003 | Glasco | |
| 2003/0212741 A1 | 11/2003 | Glasco | |
| 2003/0233388 A1 | 12/2003 | Glasco | |
| 2004/0073755 A1 | 4/2004 | Webb et al. | |
| 2004/0088493 A1 | 5/2004 | Glasco | |
| 2004/0255002 A1 | 12/2004 | Kota et al. | |

OTHER PUBLICATIONS

Andrew Tanenbaum, "Computer Networks", Computer Networks, London: Prentice Hall International, GB, 1996, pp. 345-403, XP002155220.

D. E. Culler, J. P. Singh, A. Gupta, "Parallel Computer Architecture", 1999, Morgan Kaufmann, San Francisco, CA USA XP002277658.

International Search Report dated Dec. 16, 2004 from WO Patent Application NO. PCT/US03/34756 filed OCt. 30, 2003.

Kim et al., "Power-aware Partitioned Cache Architecture", © 2001 ACM, pp. 64-67.

Powell et al., "Reducing Set-Associative Cache Energy via Way-Prediction and Selective Direct-Mapping", © 2001 IEEE, pp. 54-65.

U.S. Office Action dated Jan. 4, 2006, from U.S. Appl. No. 10/442,842 (NWISP037).

U.S. Office Action dated Sep. 5, 2005, from U.S. Appl. No. 10/635,703 (NWISP036).

U.S. Office Action dated Nov. 18, 2004, from U.S. Appl. No. 10/288,347 (NWISP024).

U.S. Office Action dated Nov. 18, 2004, from U.S. Appl. No. 10/288,399 (NWISP025).

U.S. Office Action dated Nov. 2, 2005, from U.S. Appl. No. 10/106,430 (NWISP003).

U.S. Office Action dated Dec. 16, 2004, from U.S. Publication No. US-2004-0117559-A1 published Jun. 17, 2004.

U.S. Office Action dated Mar. 1, 2006, from U.S. Appl. No. 10/635,703 (NWISP036).

U.S. Office Action dated Mar. 10, 2005, from U.S. Appl. No. 10/106,299 (NWISP004).

U.S. Office Action dated Mar. 10, 2005, from U.S. Appl. No. 10/106,430 (NWISP003).

U.S. Office Action dated Mar. 3, 2006, from U.S. Appl. No. 10/426,084 (NWISP033).

U.S. Office Action dated Mar. 7, 2005, from U.S. Appl. No. 10/106,426 (NWISP002).

U.S. Office Action dated Jul. 20, 2005, from U.S. Appl. No. 10/608,846 (NWISP030).

U.S. Office Action dated Jul. 21, 2005, from U.S. Appl. No. 10/106,299 (NWISP004).

U.S. Office Action dated Jul. 21, 2005, from U.S. Appl. No. 10/106,426 (NWISP002).

U.S. Office Action dated Jul. 21, 2005, from U.S. Appl. No. 10/106,430 (NWISP003).

U.S. Office Action dated Sep. 22, 2004, from U.S. Appl. No. 10/106,299 (NWISP004).

U.S. Office Action dated Sep. 22, 2004, from U.S. Appl. No. 10/106,426 (NWISP002).

U.S. Office Action dated Sep. 23, 2004, from U.S. Appl. No. 10/106,430 (NWISP003).

U.S. Office Action dated Sep. 9, 2005, from U.S. Appl. No. 10/426,084 (NWISP033).

U.S. Office Action dated Sep. 9, 2005, from U.S. Appl. No. 10/462,015 (NWISP040).

U.S. Office Action Final data May 12, 2005, from U.S. Appl. No. 10/288,347 (NWISP024).

U.S. Office Action Final dated May 24, 2005, from U.S. Appl. No. 10/288,399 (NWISP025).

U.S. Office Action Final dated Sep. 19, 2006, from U.S. Appl. No. 10/426,084 (NWISP033).

U.S. Office Action Final dated Sep. 20, 2005, from U.S. Appl. No. 10/288,399 (NWISP025).

* cited by examiner

Figure 7

| Coherence Directory 701 | | | |
|---|---|---|---|
| Memory Line 711 | State 713 | Dirty Data Owner 715 | Occupancy Vector 717 |
| Address 721 | Invalid | N/A | N/A |
| Address 731 | Invalid | N/A | N/A |
| Address 741 | Shared | N/A | Clusters 1,3 |
| Address 751 | Shared | N/A | Clusters 1, 2, 3, 4 |
| Address 761 | Owned | Cluster 4 | Cluster 2, 3, 4 |
| Address 771 | Owned | Cluster 2 | Cluster 2, 4 |
| Address 781 | Modified | Cluster 2 | N/A |
| Address 791 | Modified | Cluster 3 | N/A |
| ... | ... | ... | ... |

Figure 8

| Probe Filter Information 821 | Read Block (Read) 823 | Read Block Modify (Read/Write) 825 |
|---|---|---|
| Invalid 831 | Can use completion bit. Probe home cluster. (801) | Can use completion bit. Probe home cluster. (809) |
| Shared 833 | Can use completion bit. Probe home cluster. (803) | N/A (811) |
| Owned 835 | Can use completion bit. Probe remote cluster with line cached in owned state. (805) | N/A (813) |
| Modified 837 | Can use completion bit. Probe remote cluster with line cached in modified state. (807) | Can use completion bit. Probe remote cluster. (815) |

Figure 9

| Memory Controller Filter Information 921 | | |
|---|---|---|
| | Read Block [Read] 923 | Read Block Modify [Read/Write] 925 |
| Invalid 931 | Send request to target. (901) | Send request to target. (909) |
| Shared 933 | Send request to target. (903) | Send request to target. (911) |
| Owned 935 | Forward Probe To Owning Cluster. (905) | Send request to target. (913) |
| Modified 937 | Forward Probe To Modified Cluster. (907) | Forward Probe To Modified Cluster. (915) |

Figure 10

| Directory State 1001 | Remote Cache States 1003 | |
|---|---|---|
| I | I | ← 1021 - Accurate directory state |
| S<br>OV[i] = S | C[i] = S | ← 1023 - Accurate directory state |
| | C[i] = I | ← 1025 - Invalid cache states indicate the line, which was in the Shared state, was silently cast out of the remote caches. The directory entry in this case is stale. |
| O<br>O = j<br>OV[i] = s | C[j] = O | ← 1027 - Accurate directory state |
| | C[i] = S | ← 1029 - Accurate directory state |
| | C[i] = I | ← 1031 - Invalid cache states indicate the line, which was in the Shared state, was silently cast out of the remote caches. The directory entry in this case is stale. |
| M<br>O = i | C[i] = M | ← 1033 - Accurate directory state |
| | C[i] = I | ← 1035 - Invalid cache states indicate the line, which was in the Exclusive state, was silently cast out of the remote caches. The directory entry in this case is stale. |

Figure 11

| Probe Type 1101 | Cache State 1103 | Response Type 1105 | Shared 1107 | |
|---|---|---|---|---|
| S | Invalid | Clean | 0 | ← 1121 |
|   | Shared | Clean | 1 | ← 1123 |
|   | Owned | Dirty | 1 | ← 1125 |
|   | Exclusive | Clean | 1 | ← 1127 |
|   | Modified | Dirty | 1 | ← 1129 |
| I | Invalid | Clean | 0 | ← 1131 |
|   | Shared | Clean | 0 | ← 1133 |
|   | Owned | Dirty | 0 | ← 1135 |
|   | Exclusive | Clean | 0 | ← 1137 |
|   | Modified | Dirty | 0 | ← 1139 |

Figure 12A

| Probe Type 1201 | Cache State 1203 | Response Type 1205 | O/M 1207 | S/E 1209 | Shared 1211 | |
|---|---|---|---|---|---|---|
| NC | Invalid | Clean | N/A | S | 0 | ← 1221 |
| | Shared | Clean | N/A | S | 1 | ← 1223 |
| | Owned | Dirty | O | N/A | 1 | ← 1225 |
| | Exclusive | Clean | N/A | E | 1 | ← 1227 |
| | Modified | Dirty | M | N/A | 1 | ← 1229 |

Figure 12B

| Probe Type 1231 | Cache State 1233 | Response Type 1235 | O/M 1237 | S/E 1239 | Shared 1241 | New State 1243 | |
|---|---|---|---|---|---|---|---|
| S | Invalid | Clean | N/A | S | 0 | I | ← 1251 |
| | Shared | Clean | N/A | S | 1 | S | ← 1253 |
| | Owned | Dirty | O | N/A | 1 | O | ← 1255 |
| | Exclusive | Clean | N/A | E | 1 | S | ← 1257 |
| | Modified | Dirty | M | N/A | 1 | O | ← 1259 |

Figure 12C

| Probe Type 1261 | Cache State 1263 | Response Type 1265 | O/M 1267 | S/E 1269 | Shared 1271 | New State 1273 | |
|---|---|---|---|---|---|---|---|
| I | Invalid | Clean | N/A | S | 0 | I | ← 1281 |
| | Shared | Clean | N/A | S | 0 | I | ← 1283 |
| | Owned | Dirty | O | N/A | 0 | I | ← 1285 |
| | Exclusive | Clean | N/A | E | 0 | I | ← 1287 |
| | Modified | Dirty | M | N/A | 0 | I | ← 1289 |

Figure 14

| Local Probe Type 1401 | Directory State 1403 | Response 1405 Dirty O/M 1411 | Clean S/E 1413 | S 14 15 | Actions 1407 New State 1417 | New OV/OC 1419 | |
|---|---|---|---|---|---|---|---|
| Non-Change | I | | | | | | ← 1451 - No change |
| | S | N/A | S | 1 | S | OV[Tgt]=1 | ← 1453 - No change |
| | | N/A | S | 0 | S I if OV=0 | OV[Tgt]=0 | ← 1455 - Probed cluster is in Invalid state. Update dir state to Shared |
| | O OV[i]=1 OC = Tgt | O | N/A | 1 | O | OV[Tgt]=1 OC = Tgt | ← 1461 - No change |
| | | N/A | S | 1 | S | OV[Tgt]=1 | ← 1463 - Probed cluster is in Shared state. Update dir to Shared |
| | | N/A | N/A | 0 | I | OV[Tgt]=0 | ← 1465 - Probed cluster is in Invalid state not Owned |
| | M OV[i]=x OC = Tgt | M | N/A | 1 | M | OV[Tgt]=1 OC = Tgt | ← 1471 - No change |
| | | N/A | E | 1 | M | OV[Tgt]=1 OC=Tgt | ← 1473 - No change. Cache can move to M without notification |
| | | O | N/A | 1 | O | OV[Tgt]=1 OC = Tgt | ← 1475 - Probed cluster is in Owned state. Move to Owned directory state |
| | | N/A | S | 1 | S | OV[Tgt]=1 | ← 1477 - Probed clusters are in Shared state. Update directory to Shared |
| | | N/A | N/A | 0 | I | OV[Tgt]=0 | ← 1479 - Probed cluster is in Invalid state. Update directory to Invalid |

Figure 17

| Local Probe Type 1701 | Directory State 1703 | Response 1705 | | | Actions 1707 | | |
|---|---|---|---|---|---|---|---|
| | | Dirty O/M 1711 | Clean S/E 1713 | S 1715 | New State 1719 | New OV/OC 1721 | |
| Shared Probe sent to remote cluster (Tgt) containing dirty data (O/M) | I | | | | | | ← 1751 - No probing |
| | S | | | | | | ← 1753 - No probing |
| | O OV[i]=1 OC = Tgt | O | N/A | 1 | O | OV[Tgt]=1 OC = Tgt | ← 1761 - Normal flow |
| | | N/A | S | 1 | S | OV[Tgt]=1 | ← 1763 - Probed cluster is in Shared state not Owned |
| | | N/A | N/A | 0 | S I if OV = 0 | OV[Tgt]=0 | ← 1765 - Probed cluster is in Invalid state not Owned |
| | M OV[i]=x OC = Tgt | M | N/A | 1 | O | OV[Tgt]=1 OC = Tgt | ← 1771 - Normal flow |
| | | N/A | E | 1 | S | OV[Tgt]=1 | ← 1773 - Probed cluster is in Exclusive state. Move to Shared directory state |
| | | N/A | S | 1 | S | OV[Tgt]=1 | ← 1775 - Probed cluster is in Shared state. Move to Shared directory state |
| | | N/A | N/A | 0 | I | OV[Tgt]=0 | ← 1777 - Probed cluster is in Invalid state. Move to Invalid directory state |
| Invalidating Probe sent to all remote clusters caching memory line | I, S | N/A | X | 0 | I | X | ← 1781 - No change |
| | O, M | X | N/A | 0 | I | X | ← 1783 - Move to Invalid directory state |

Figure 18

| Remote Probe Type 1801 | Dir State 1803 | Response 1805 | | | Actions 1813 | | |
|---|---|---|---|---|---|---|---|
| | | Dirty O/M 1807 | Clean S/E 1809 | S 1811 | New State 1815 | New OV/OC 1817 | |
| Shared Probe sent to remote cluster containing dirty data (O/M) | I | | | | S | OV[Req]=1 | ← 1831 – No probing |
| | S | | | | S | OV[Req]=1 | ← 1833 – No probing |
| | O OV[Tgt]=1 OC = Tgt | O | N/A | 1 | O | OV[Req]=1 OV[Tgt]=1 OC = Tgt | ← 1835 - Normal flow |
| | | N/A | S | 1 | S | OV[Req]=1 OV[Tgt]=1 | ← 1837 - Probed cluster in Shared state |
| | | N/A | N/A | 0 | S | OV[Req]=1 OV[Tgt]=0 | ← 1839 - Probed cluster in Invalid state |
| | M OV[Tgt]=1 OC = Tgt | M | N/A | 1 | O | OV[Req]=1 OV[Tgt]=1 OC = Tgt | ← 1841 - Normal flow |
| | | N/A | E | 1 | S | OV[Req]=1 OV[Tgt]=1 | ← 1843 – Probed cluster in Exclusive state. Move to Shared dir state |
| | | N/A | N/A | 0 | S | OV[Req]=1 OV[Tgt]=0 | ← 1845 – Probed cluster is in Invalid state. Move to Shared directory state |
| Invalidating Probe sent to all remote clusters caching memory line | I | N/A | X | X | M | OV[Req]=1 OC = Req | ← 1847 – No probing. Move directory state to M |
| | S, O, M | X | N/A | X | M | OV[Req]=1 OC = Req | ← 1849 - Probe remote clusters. Move directory state to M |

METHODS AND APPARATUS FOR MAINTAINING REMOTE CLUSTER STATE INFORMATION

CROSS-REFERENCE TO RELATED APPLICATIONS

The present application is a continuation-in-part of filed U.S. patent application Ser. Nos. 10/288,347 and 10/288,399, both titled Methods And Apparatus For Managing Probe Requests by David B. Glasco and filed on Nov. 4, 2002, the entireties of which are incorporated by reference herein for all purposes.

BACKGROUND OF THE INVENTION

1. Field of the Invention

The present invention generally relates to accessing data in a multiple processor system. More specifically, the present invention provides techniques for improving data access efficiency while maintaining cache coherency in a multiple processor system having a multiple cluster architecture.

2. Description of Related Art

Performance limitations have led to the development of a point-to-point architecture for connecting processors in a system with a single memory space. In one example, individual processors can be directly connected to each other through a plurality of point-to-point links to form a cluster of processors. Separate clusters of processors can also be connected. The point-to-point links significantly increase the bandwidth for coprocessing and multiprocessing functions.

In such a multiple processor, multiple cluster system, processors send probe requests in order to perform operations on particular memory lines that may be cached in local or remote nodes. Some common operations include read block and read block modify operations on memory lines. In many examples, cache coherence controllers manage the transmission of probes and probe requests between clusters. However, the intelligence behind determining how to efficiently manage the transmission of probe requests between clusters is limited. In particular, many unnecessary probe requests may be sent to remote clusters because of either limited or stale information available to a cache coherence controller.

Consequently, it is desirable to provide techniques for improving the management and distribution of probe requests in systems having multiple clusters of multiple processors connected using point-to-point links.

SUMMARY OF THE INVENTION

According to the present invention, methods and apparatus are provided for increasing the efficiency of data access in a multiple processor, multiple cluster system. Mechanisms for improving the accuracy of information available to a cache coherence controller are provided in order to allow the cache coherence controller to reduce the number of transactions in a multiple cluster system. Non-change probes and augmented non-change probe responses are provided to acquire state information in remote clusters without affecting the state of the probed memory line. Augmented probe responses associated with shared and invalidating probes are provided to update state information in a coherence directory during read and read/write probe requests.

In one aspect, a computer system is provided. The computer system includes a home cluster and a remote cluster. The home cluster includes a first plurality of processors and a home cache coherence controller associated with a coherence directory. The coherence directory has state information corresponding to home cluster memory lines cached remotely. The remote cluster includes a second plurality of processors and a remote cache coherence controller. The remote cache coherence controller is configured to receive a non-change probe associated with a memory line from the home cluster and probe remote cluster nodes to obtain cache state information for the memory line.

In another aspect, a method for probing nodes is provided. A non-change probe associated with a memory line is generated at a home cluster having a coherence directory. The non-change probe is forwarded to a remote cluster. The remote cluster is configured to receive the non-change probe and probe remote cluster nodes to obtain cache state information associated with the memory line.

In another aspect, a computer system is provided. The computer system includes a home cluster and a remote cluster. A home cluster includes a first plurality of processors and a home cache coherence controller associated with a coherence directory. The coherence directory has state information corresponding to home cluster memory lines cached remotely. The home cache coherence controller receives a probe associated with a memory line from a home cluster processor. A remote cluster includes a second plurality of processors and a remote cache coherence controller. The remote cache coherence controller is configured to receive a probe from the home cluster cache coherence controller and probe remote cluster nodes to obtain an augmented probe response for the memory line.

In yet another aspect, a method for probing cache lines is provided. A probe request associated with a memory line from a local processor is received. A probe associated with the probe request is forwarded to a remote cluster of processors. The remote cluster is configured to provide an augmented probe response. The augmented probe response has cache state information and probe response information for the memory line.

In still another aspect, a computer system is provided. The computer system includes a request cluster, a home cluster, and a remote cluster. A request cluster includes a first plurality of processors and a request cache coherence controller. The request cache coherence controller is configured to receive a request associated with a memory line from a request cluster processor and forward the request. A home cluster includes a second plurality of processors and a home cache coherence controller associated with a coherence directory. The coherence directory has state information corresponding to home cluster memory lines cached remotely. The home cache coherence controller receives the forwarded request from the request cluster. A remote cluster includes a third plurality of processors and a remote cache coherence controller. The remote cache coherence controller is configured to receive a probe associated with the memory line from the home cluster cache coherence controller and probe remote cluster nodes to obtain an augmented probe response for the memory line.

In another aspect, a method for probing cache lines is provided. A probe request associated with a memory line is received from a request cluster of processors. A coherence directory is accessed to identify a remote cluster for probing. A probe associated with the probe request is forwarded to the remote cluster of processors. The remote cluster is configured to provide an augmented probe response.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

FIG. 7 is a diagrammatic representation showing a cache coherence directory.

FIG. 8 is a diagrammatic representation showing probe filter information that can be used to reduce the number of probes transmitted to various clusters.

FIG. 9 is a diagrammatic representation showing memory controller filter information.

FIG. 10 is a table showing situations where directory state information may be stale.

FIG. 11 is a table showing information carried in a typical cache probe response.

FIGS. 12A-C are tables showing information carried in augmented non-change, shared, and invalidating probe responses.

FIG. 14 is a table showing updates to coherence directory information that can be made upon receiving augmented probes.

FIG. 17 is a table showing updates to coherence directory information made upon receiving augmented probe responses initiated as a result of a home cluster request.

FIG. 18 is a table showing updates to coherence directory information made upon receiving augmented probe responses initiated as a result of a request cluster request.

DETAILED DESCRIPTION OF SPECIFIC EMBODIMENTS

Figure 1A:
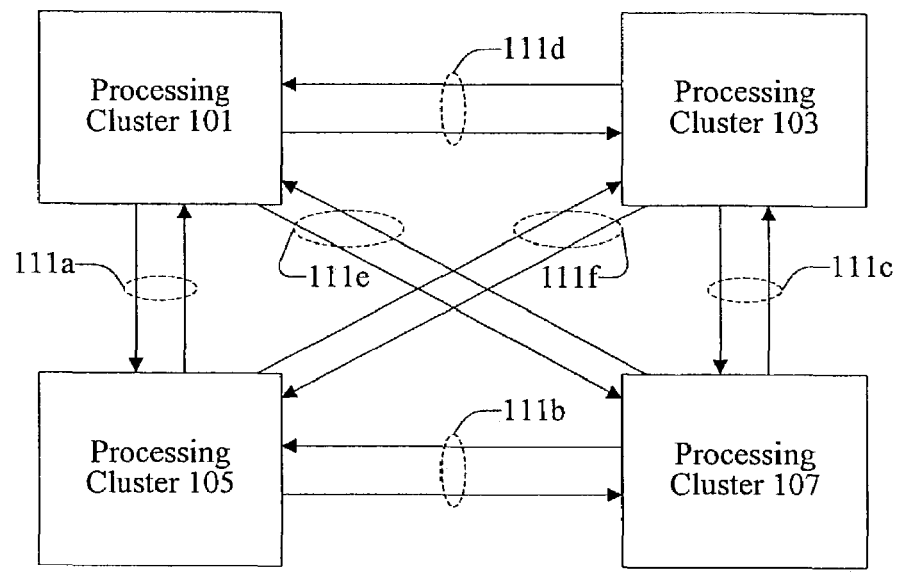
FIGS. 1A and 1B are diagrammatic representation depicting a system having multiple clusters.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. Multi-processor architectures having point-to-point communication among their processors are suitable for implementing specific embodiments of the present invention. In the following description, numerous specific details are set forth in order to provide a thorough understanding of the present invention. The present invention may be practiced without some or all of these specific details. Well-known process operations have not been described in detail in order not to unnecessarily obscure the present invention. Furthermore, the present application's reference to a particular singular entity includes that possibility that the methods and apparatus of the present invention can be implemented using more than one entity, unless the context clearly dictates otherwise.

Techniques are provided for increasing data access efficiency in a multiple processor, multiple cluster system. In a point-to-point architecture, a cluster of processors includes multiple processors directly connected to each other through point-to-point links. By using point-to-point links instead of a conventional shared bus or external network, multiple processors are used efficiently in a system sharing the same memory space. Processing and network efficiency are also improved by avoiding many of the bandwidth and latency limitations of conventional bus and external network based multiprocessor architectures. According to various embodiments, however, linearly increasing the number of processors in a point-to-point architecture leads to an exponential increase in the number of links used to connect the multiple processors. In order to reduce the number of links used and to further modularize a multiprocessor system using a point-to-point architecture, multiple clusters are used.

According to various embodiments, the multiple processor clusters are interconnected using a point-to-point architecture. Each cluster of processors includes a cache coherence controller used to handle communications between clusters. In one embodiment, the point-to-point architecture used to connect processors are used to connect clusters as well.

By using a cache coherence controller, multiple cluster systems can be built using processors that may not necessarily support multiple clusters. Such a multiple cluster system can be built by using a cache coherence controller to represent non-local nodes in local transactions so that local nodes do not need to be aware of the existence of nodes outside of the local cluster. More detail on the cache coherence controller will be provided below.

In a single cluster system, cache coherency can be maintained by sending all data access requests through a serialization point. Any mechanism for ordering data access requests is referred to herein as a serialization point. One example of a serialization point is a memory controller. Various processors in the single cluster system send data access requests to the memory controller. In one example, the memory controller is configured to serialize or lock the data access requests so that only one data access request for a given memory line is allowed at any particular time. If another processor attempts to access the same memory line, the data access attempt is blocked until the memory line is unlocked. The memory controller allows cache coherency to be maintained in a multiple processor, single cluster system.

A serialization point can also be used in a multiple processor, multiple cluster system where the processors in the various clusters share a single address space. By using a single address space, internal point-to-point links can be used to significantly improve intercluster communication over traditional external network based multiple cluster systems. Various processors in various clusters send data access requests to a memory controller associated with a particular cluster such as a home cluster. The memory controller can similarly serialize all data requests from the different clusters. However, a serialization point in a multiple processor, multiple cluster system may not be as efficient as a serialization point in a multiple processor, single cluster system. That is, delay resulting from factors such as latency from transmitting between clusters can adversely affect the response times for various data access requests. It should be noted that delay also results from the use of probes in a multiple processor environment.

Although delay in intercluster transactions in an architecture using a shared memory space is significantly less than the delay in conventional message passing environments using external networks such as Ethernet or Token Ring, even minimal delay is a significant factor. In some applications, there may be millions of data access requests from a processor in a fraction of a second. Any delay can adversely impact processor performance.

According to various embodiments, probe management is used to increase the efficiency of accessing data in a multiple processor, multiple cluster system. A mechanism for eliciting a response from a node to maintain cache coherency in a system is referred to herein as a probe. In one example, a mechanism for snooping a cache is referred to as a probe. A response to a probe can be directed to the source or target of the initiating request. Any mechanism for filtering or reducing the number of probes and probe requests transmitted to various nodes is referred to herein as managing probes. In one example, managing probe entails characterizing a probe request to determine if a probe can be transmitted to a reduced number of entities.

In typical implementations, probe requests are sent to a memory controller that broadcasts probes to various nodes in a system. In such a system, no knowledge of the cache line state is known. All nodes in the system are probed and the request cluster receives a response from each node. In a system with a coherence directory, state information associated with various memory lines can be used to reduce the number of transactions. Any mechanism for maintaining state information associated with various memory lines is referred to herein as a coherence directory. A coherence directory typically includes information for memory lines in a local cluster that are cached in a remote cluster. According to various embodiments, a coherence directory is used to reduce the number of probes to remote quads by inferring the state of local caches. In other embodiments, a coherence directory is used to eliminate the transmission of a request to a memory controller in a home cluster.

FIG. 1A is a diagrammatic representation of one example of a multiple cluster, multiple processor system that can use the techniques of the present invention. Each processing cluster 101, 103, 105, and 107 can include a plurality of processors. The processing clusters 101, 103, 105, and 107 are connected to each other through point-to-point links 111a-f. In one embodiment, the multiple processors in the multiple cluster architecture shown in FIG. 1A share the same memory space. In this example, the point-to-point links 111a-f are internal system connections that are used in place of a traditional front-side bus to connect the multiple processors in the multiple clusters 101, 103, 105, and 107. The point-to-point links may support any point-to-point coherence protocol.

Figure 1B:
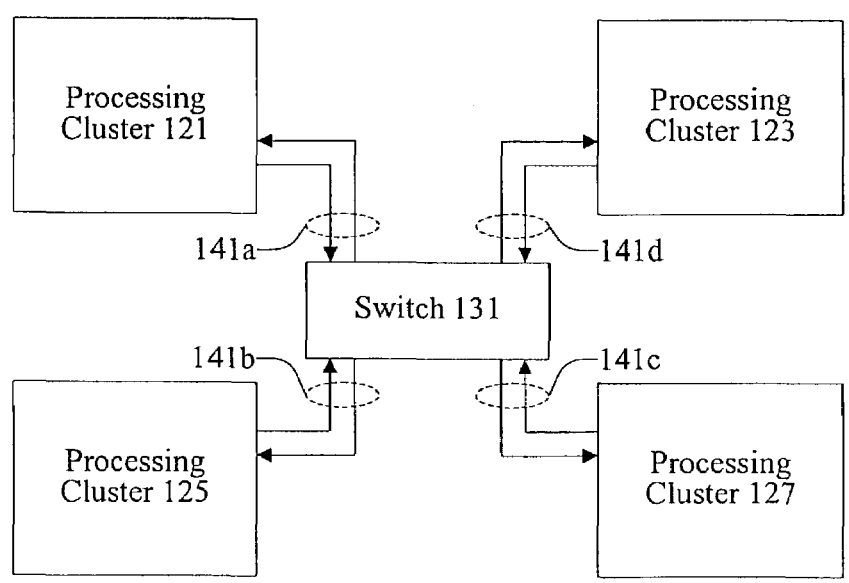

FIG. 1B is a diagrammatic representation of another example of a multiple cluster, multiple processor system that can use the techniques of the present invention. Each processing cluster 121, 123, 125, and 127 can be coupled to a switch 131 through point-to-point links 141a-d. It should be noted that using a switch and point-to-point links allows implementation with fewer point-to-point links when connecting multiple clusters in the system. A switch 131 can include a processor with a coherence protocol interface. According to various implementations, a multicluster system shown in FIG. 1A is expanded using a switch 131 as shown in FIG. 1B.

Figure 2:
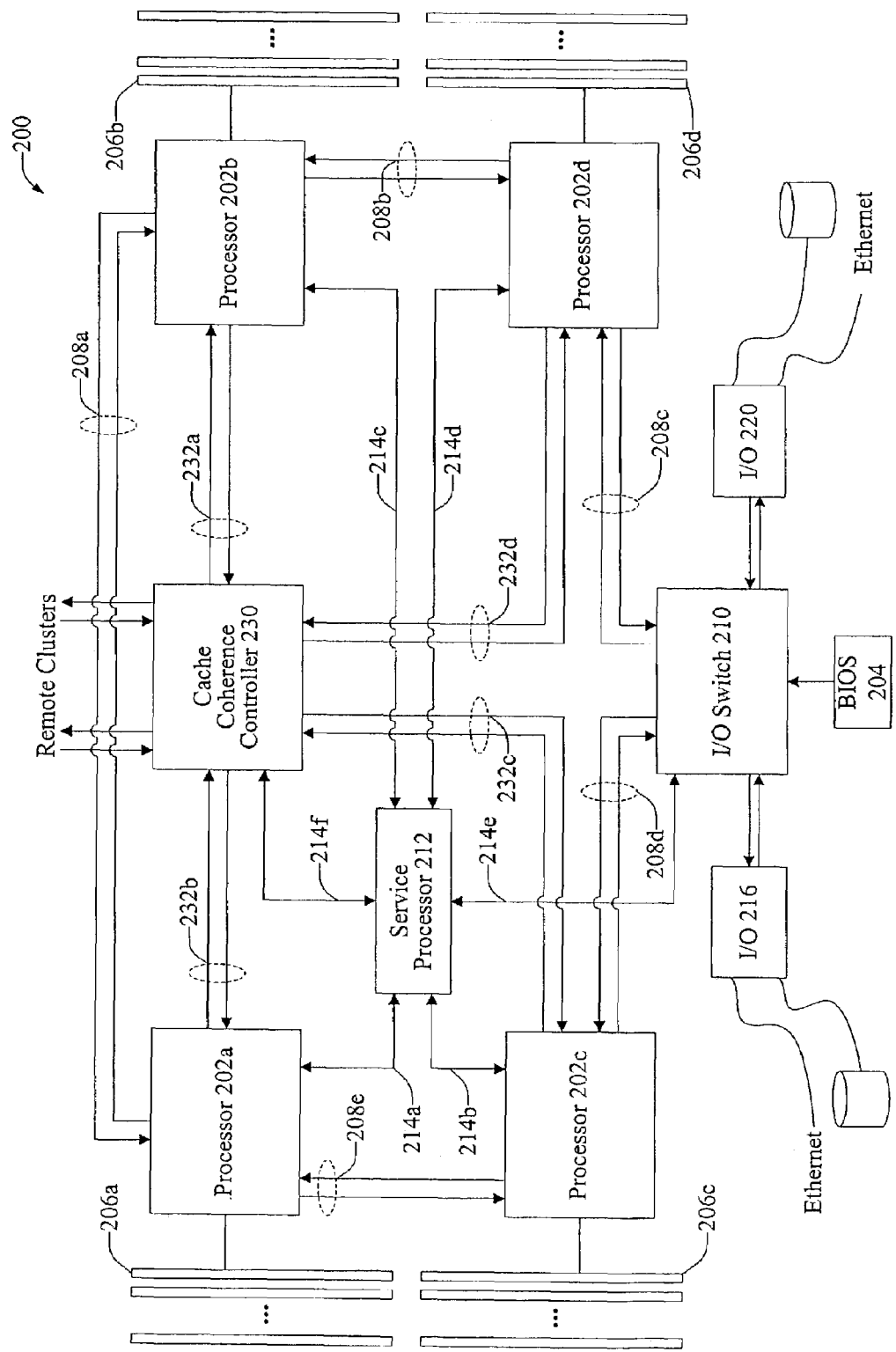
FIG. 2 is a diagrammatic representation of a cluster having a plurality of processors.

FIG. 2 is a diagrammatic representation of a multiple processor cluster, such as the cluster 101 shown in FIG. 1A. Cluster 200 includes processors 202a-202d, one or more Basic I/O systems (BIOS) 204, a memory subsystem comprising memory banks 206a-206d, point-to-point communication links 208a-208e, and a service processor 212. The point-to-point communication links are configured to allow interconnections between processors 202a-202d, I/O switch 210, and cache coherence controller 230. The service processor 212 is configured to allow communications with processors 202a-202d, I/O switch 210, and cache coherence controller 230 via a JTAG interface represented in FIG. 2 by links 214a-214f. It should be noted that other interfaces are supported. It should also be noted that in some implementations, a service processor is not included in multiple processor clusters. I/O switch 210 connects the rest of the system to I/O adapters 216 and 220.

According to specific embodiments, the service processor of the present invention has the intelligence to partition system resources according to a previously specified partitioning schema. The partitioning can be achieved through direct manipulation of routing tables associated with the system processors by the service processor which is made possible by the point-to-point communication infrastructure. The routing tables are used to control and isolate various system resources, the connections between which are defined therein.

The processors 202a-d are also coupled to a cache coherence controller 230 through point-to-point links 232a-d. Any mechanism or apparatus that can be used to provide communication between multiple processor clusters while maintaining cache coherence is referred to herein as a cache coherence controller. The cache coherence controller 230 can be coupled to cache coherence controllers associated with other multiprocessor clusters. It should be noted that there can be more than one cache coherence controller in one cluster. The cache coherence controller 230 communicates with both processors 202a-d as well as remote clusters using a point-to-point protocol.

More generally, it should be understood that the specific architecture shown in FIG. 2 is merely exemplary and that embodiments of the present invention are contemplated having different configurations and resource interconnections, and a variety of alternatives for each of the system resources shown. However, for purpose of illustration, specific details of server 200 will be assumed. For example, most of the resources shown in FIG. 2 are assumed to reside on a single electronic assembly. In addition, memory banks 206a-206d may comprise double data rate (DDR) memory which is physically provided as dual in-line memory modules (DIMMs). I/O adapter 216 may be, for example, an ultra direct memory access (UDMA) controller or a small computer system interface (SCSI) controller which provides access to a permanent storage device. I/O adapter 220 may be an Ethernet card adapted to provide communications with a network such as, for example, a local area network (LAN) or the Internet.

According to a specific embodiment and as shown in FIG. 2, both of I/O adapters 216 and 220 provide symmetric I/O access. That is, each provides access to equivalent sets of I/O. As will be understood, such a configuration would facilitate a partitioning scheme in which multiple partitions have access to the same types of I/O. However, it should also be understood that embodiments are envisioned in which partitions without I/O are created. For example, a partition including one or more processors and associated memory resources, i.e., a memory complex, could be created for the purpose of testing the memory complex.

According to one embodiment, service processor 212 is a Motorola MPC855T microprocessor which includes integrated chipset functions. The cache coherence controller 230 is an Application Specific Integrated Circuit (ASIC) supporting the local point-to-point coherence protocol. The cache coherence controller 230 can also be configured to handle a non-coherent protocol to allow communication with I/O devices. In one embodiment, the cache coherence controller 230 is a specially configured programmable chip such as a programmable logic device or a field programmable gate array.

Figure 3:
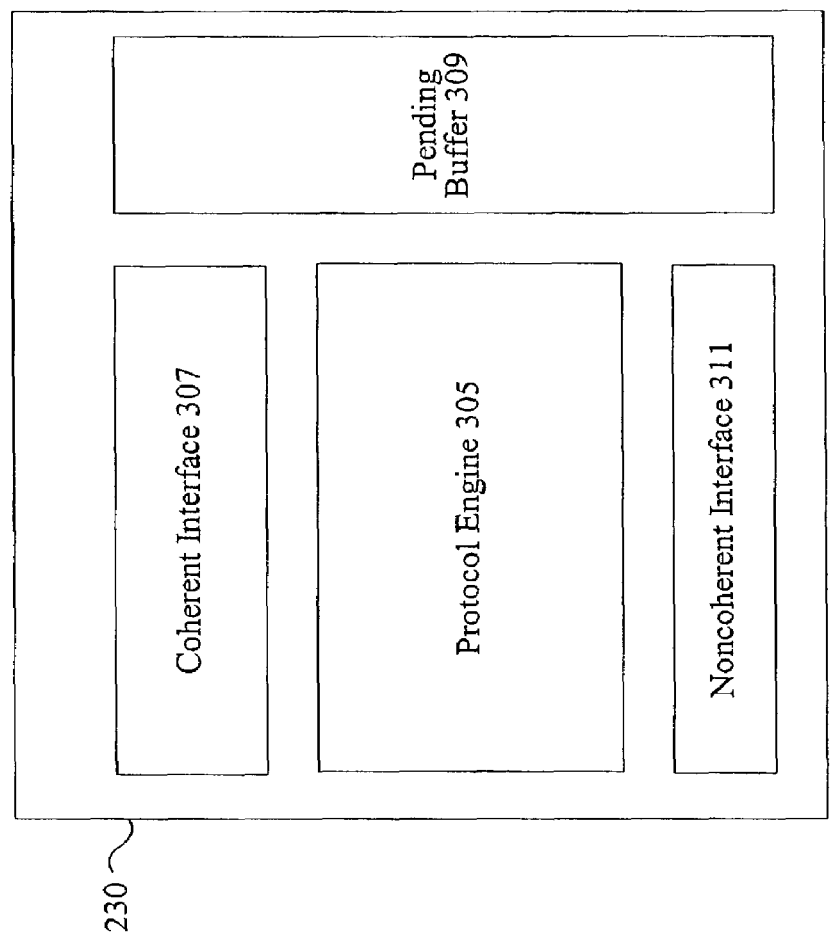
FIG. 3 is a diagrammatic representation of a cache coherence controller.

FIG. 3 is a diagrammatic representation of one example of a cache coherence controller 230. According to various embodiments, the cache coherence controller includes a protocol engine 305 configured to handle packets such as probes and requests received from processors in various clusters of a multiprocessor system. The functionality of the protocol engine 305 can be partitioned across several engines to improve performance. In one example, partitioning is done based on packet type (request, probe and response), direction (incoming and outgoing), or transaction flow (request flows, probe flows, etc).

The protocol engine 305 has access to a pending buffer 309 that allows the cache coherence controller to track transactions such as recent requests and probes and associate the transactions with specific processors. Transaction information maintained in the pending buffer 309 can include transaction destination nodes, the addresses of requests for subsequent collision detection and protocol optimizations, response information, tags, and state information.

The cache coherence controller has an interface such as a coherent protocol interface 307 that allows the cache coherence controller to communicate with other processors in the cluster as well as external processor clusters. According to various embodiments, each interface 307 and 311 is implemented either as a full crossbar or as separate receive and transmit units using components such as multiplexers and buffers. The cache coherence controller can also include other interfaces such as a non-coherent protocol interface 311 for communicating with I/O devices. It should be noted, however, that the cache coherence controller 230 does not necessarily need to provide both coherent and non-coherent interfaces. It should also be noted that a cache coherence controller in one cluster can communicate with a cache coherence controller in another cluster.

Figure 4:
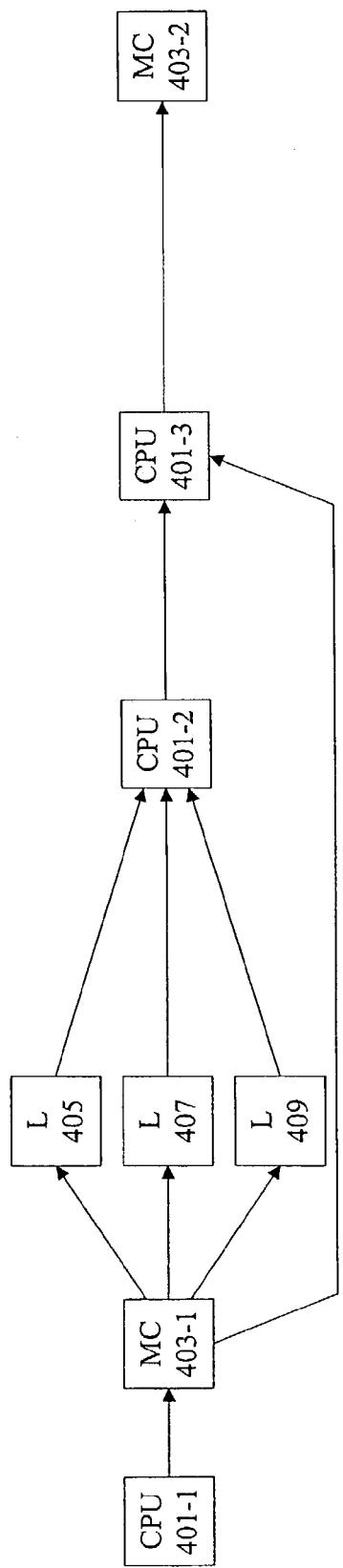
FIG. 4 is a diagrammatic representation showing a transaction flow for a data access request from a processor in a single cluster.

FIG. 4 is a diagrammatic representation showing the transactions for a cache request from a processor in a system having a single cluster without using a cache coherence controller. A processor 401-1 sends an access request such as a read memory line request to a memory controller 403-1. The memory controller 403-1 may be associated with this processor, another processor in the single cluster or may be a separate component such as an ASIC or specially configured Programmable Logic Device (PLD). To preserve cache coherence, only one processor is typically allowed to access a memory line corresponding to a shared address space at anyone given time. To prevent other processors from attempting to access the same memory line, the memory line can be locked by the memory controller 403-1. All other requests to the same memory line are blocked or queued. Access by another processor is typically only allowed when the memory controller 403-1 unlocks the memory line.

The memory controller 403-1 then sends probes to the local cache memories 405, 407, and 409 to determine cache states. The local cache memories 405, 407, and 409 then in turn send probe responses to the same processor 401-2. The memory controller 403-1 also sends an access response such as a read response to the same processor 401-3. The processor 401-3 can then send a done response to the memory controller 403-2 to allow the memory controller 403-2 to unlock the memory line for subsequent requests. It should be noted that CPU 401-1, CPU 401-2, and CPU 401-3 refer to the same processor.

FIGS. 5A-5D are diagrammatic representations depicting cache coherence controller operation. The use of a cache coherence controller in multiprocessor clusters allows the creation of a multiprocessor, multicluster coherent domain without affecting the functionality of local nodes such as processors and memory controllers in each cluster. In some instances, processors may only support a protocol that allows for a limited number of processors in a single cluster without allowing for multiple clusters. The cache coherence controller can be used to allow multiple clusters by making local processors believe that the non-local nodes are merely a single local node embodied in the cache coherence controller. In one example, the processors in a cluster do not need to be aware of processors in other clusters. Instead, the processors in the cluster communicate with the cache coherence controller as though the cache coherence controller were representing all non-local nodes.

It should be noted that nodes in a remote cluster will be referred to herein as non-local nodes or as remotes nodes. However, non-local nodes refer to nodes not in a request cluster generally and includes nodes in both a remote cluster and nodes in a home cluster. A cluster from which a data access or cache access request originates is referred to herein as a request cluster. A cluster containing a serialization point is referred to herein as a home cluster. Other clusters are referred to as remote clusters. The home cluster and the remote cluster are also referred to herein as non-local clusters.

Figure 5A:
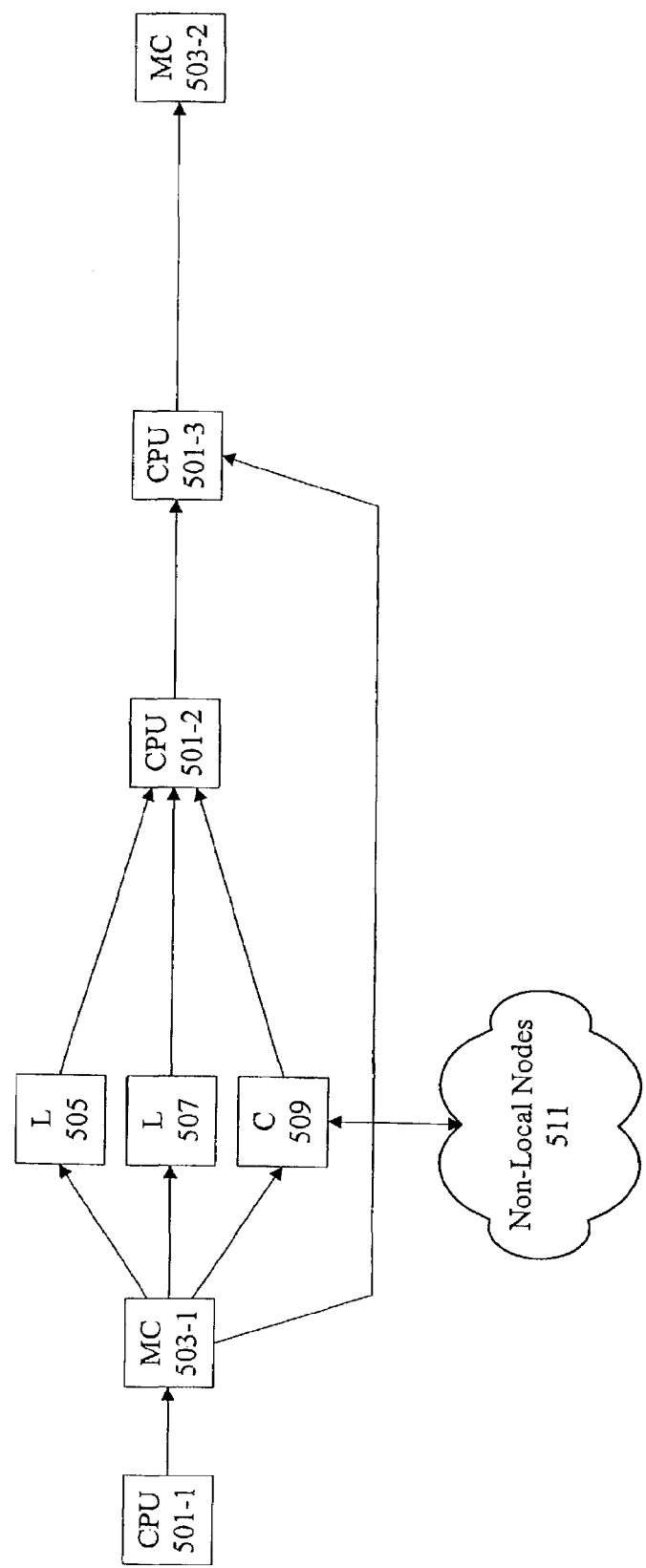
FIGS. 5A-5D are diagrammatic representations showing cache coherence controller functionality.

FIG. 5A shows the cache coherence controller acting as an aggregate remote cache. When a processor 501-1 generates a data access request to a local memory controller 503-1, the cache coherence controller 509 accepts the probe from the local memory controller 503-1 and forwards it to non-local node portion 511. It should be noted that a coherence protocol can contain several types of messages. In one example, a coherence protocol includes four types of messages; data or cache access requests, probes, responses or probe responses, and data packets. Data or cache access requests usually target the home node memory controller. Probes are used to query each cache in the system. The probe packet can carry information that allows the caches to properly transition the cache state for a specified line. Responses are used to carry probe response information and to allow nodes to inform other nodes of the state of a given transaction. Data packets carry request data for both write requests and read responses.

According to various embodiments, the memory address resides at the local memory controller. As noted above, nodes including processors and cache coherence controllers outside of a local cluster are referred to herein as non-local nodes. The cache coherence controller 509 then accumulates the response from the non-local nodes and sends a single response in the same manner that local nodes associated with cache blocks 505 and 507 send a single response to processor 501-2. Local processors may expect a single probe response for every local node probed. The use of a cache coherence controller allows the local processors to operate without concern as to whether non-local nodes exist.

It should also be noted that components such as processor 501-1 and processor 501-2 refer herein to the same component at different points in time during a transaction sequence. For example, processor 501-1 can initiate a data access request and the same processor 501-2 can later receive probe responses resulting from the request.

Figure 5B:
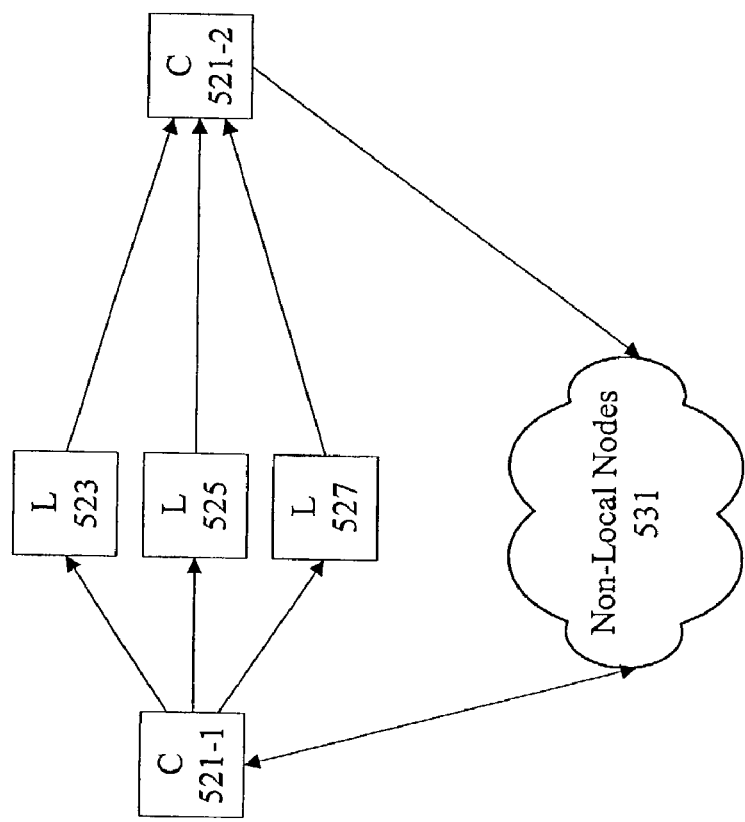

FIG. 5B shows the cache coherence controller acting as a probing agent pair. When the cache coherence controller 521-1 receives a probe from non-local nodes 531, the cache coherence controller 521-1 accepts the probe and forwards the probe to local nodes associated with cache blocks 523, 525, and 527. The cache coherence controller 521-2 then forwards a final response to the non-local node portion 531. In this example, the cache coherence controller is both the source and the destination of the probes. The local nodes associated with cache blocks 523, 525, and 527 behave as if the cache coherence controller were a local processor with a local memory request.

Figure 5C:
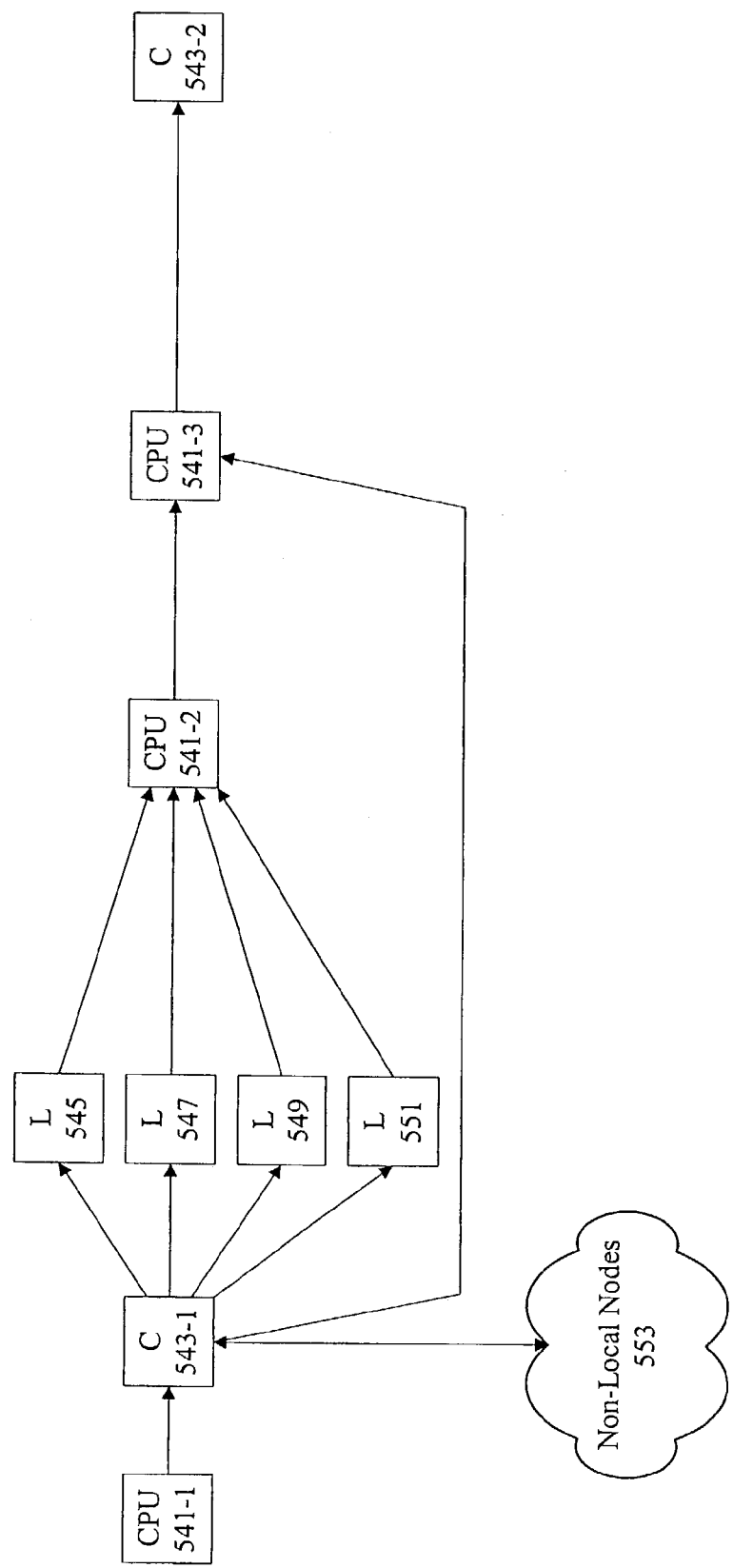

FIG. 5C shows the cache coherence controller acting as a remote memory. When a local processor 541-1 generates an access request that targets remote memory, the cache coherence controller 543-1 forwards the request to the non-local nodes 553. When the remote request specifies local probing, the cache coherence controller 543-1 generates probes to local nodes and the probed nodes provide responses to the processor 541-2. Once the cache coherence controller 543-1 has received data from the non-local node portion 553, it forwards a read response to the processor 541-3. The cache coherence controller also forwards the final response to the remote memory controller associated with non-local nodes 553.

Figure 5D:
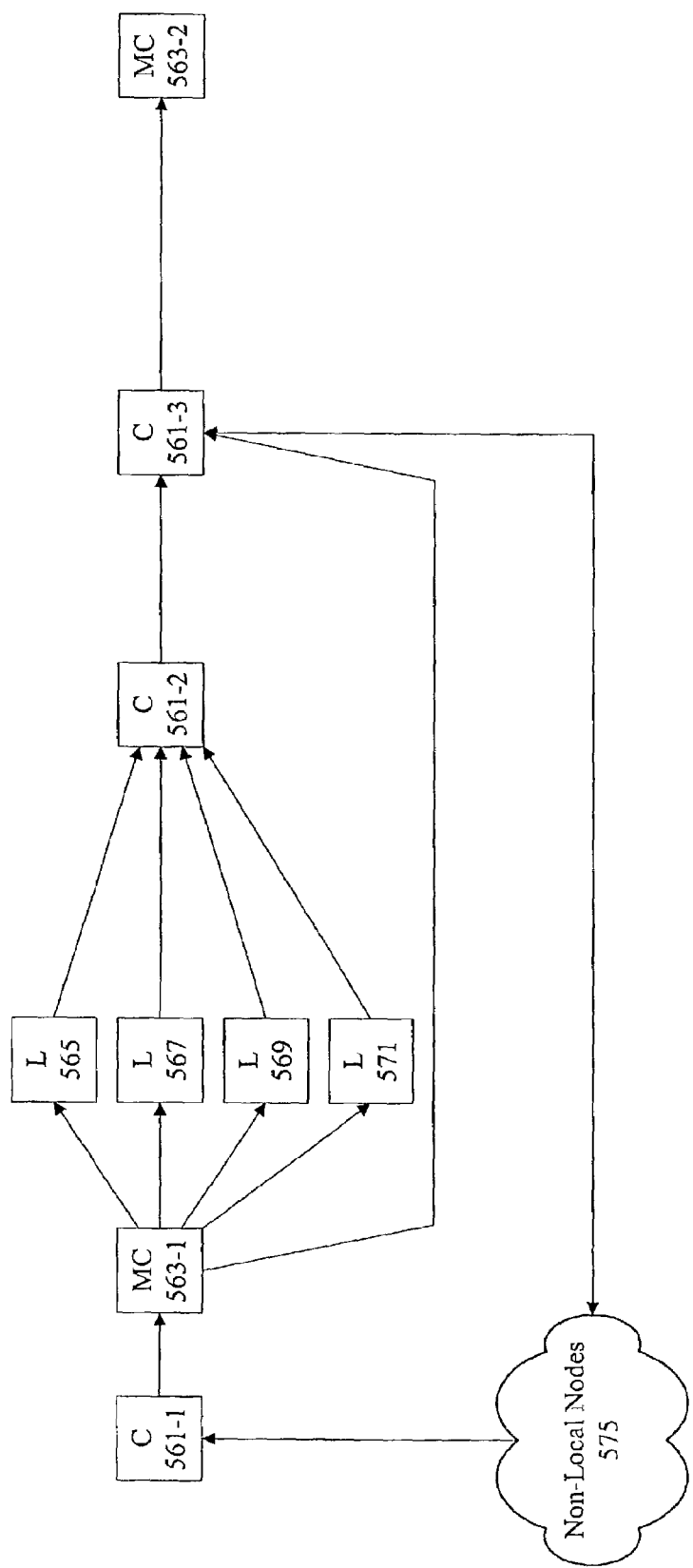

FIG. 5D shows the cache coherence controller acting as a remote processor. When the cache coherence controller 561-1 at a first cluster receives a request from a processor in a second cluster, the cache coherence controller acts as a first cluster processor on behalf of the second cluster processor. The cache coherence controller 561-1 accepts the request from portion 575 and forwards it to a memory controller 563-1. The cache coherence controller 561-2 then accumulates all probe responses as well as the data fetched and forwards the final response to the memory controller 563-2 as well as to non-local nodes 575.

By allowing the cache coherence controller to act as an aggregate remote cache, probing agent pair, remote memory, and remote processor, multiple cluster systems can be built using processors that may not necessarily support multiple clusters. The cache coherence controller can be used to represent non-local nodes in local transactions so that local nodes do not need to be aware of the existence of nodes outside of the local cluster.

Figure 6:
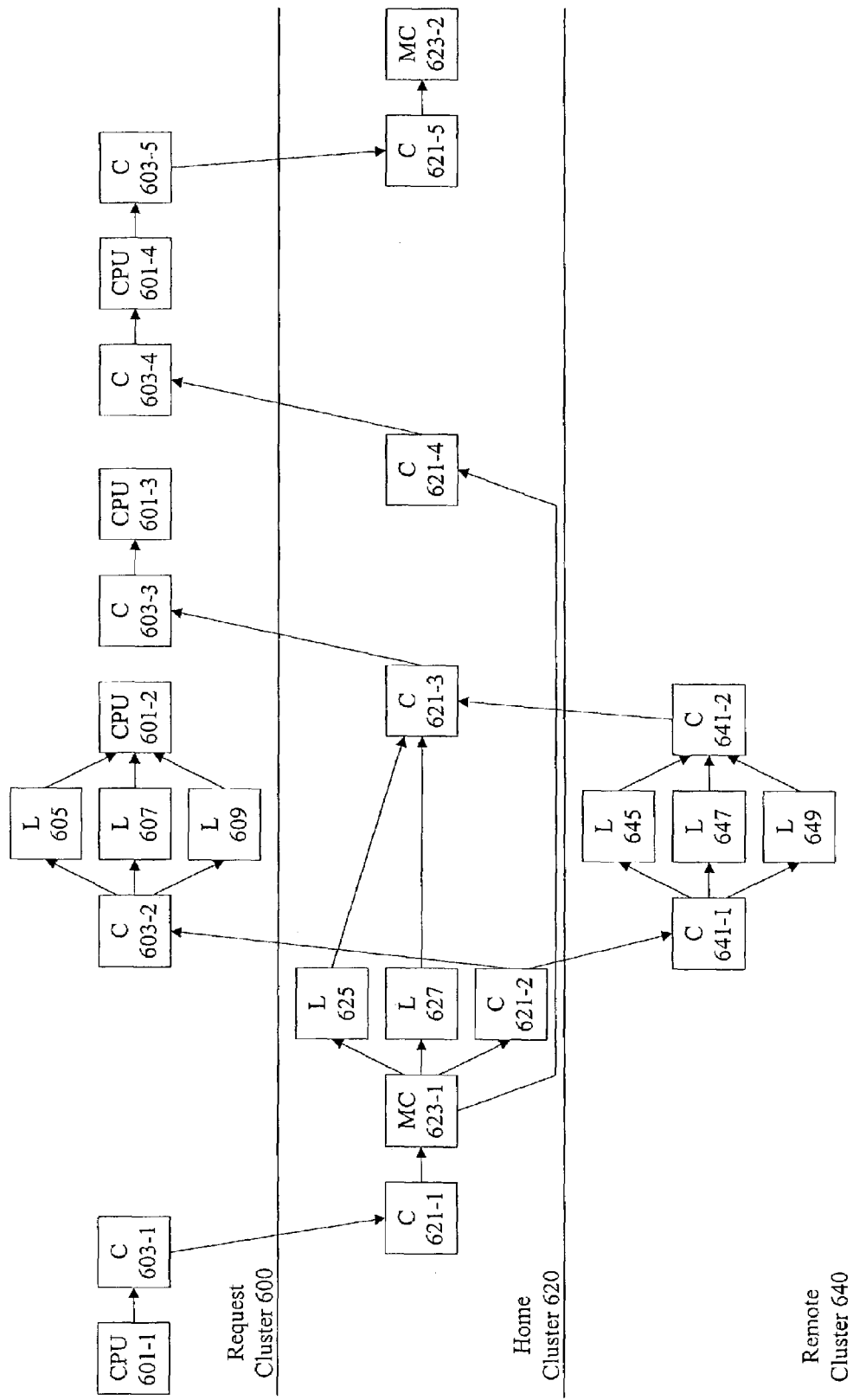
FIG. 6 is a diagrammatic representation depicting a transaction flow for a probe request with multiple probe responses.

FIG. 6 is a diagrammatic representation depicting the transactions for a data request from a local processor sent to a non-local cluster using a cache coherence controller. The multicluster system includes a request cluster 600, a home cluster 620, and a remote cluster 640. As noted above, the home cluster 620 and the remote cluster 640 as well as any other clusters excluding the request cluster 600 are referred to herein as non-local clusters. Processors and cache coherence controllers associated with local and non-local clusters are similarly referred to herein as local processors, local cache coherence controllers, non-local processors, and non-local cache coherence controllers, respectively.

According to various embodiments, processor 601-1 in a local cluster 600 sends a data access request such as a read request to a cache coherence controller 603-1. The cache coherence controller 603-1 tracks the transaction in the pending buffer of FIG. 3 and forwards the request to a cache coherence controller 621-1 in a home cluster 620. The cache coherence controller 621-1 at the home cluster 620 receives the access request and tracks the request in its pending buffer. In one example, information associated with the requests are stored in the pending buffer. The cache coherence controller 621-1 forwards the access request to a memory controller 623-1 also associated with the home cluster 620. At this point, the memory controller 623-1 locks the memory line associated with the request. In one example, the memory line is a unique address in the memory space shared by the multiple processors in the request cluster 600, home cluster 620, and the remote cluster 640. The memory controller 623-1 generates a probe associated with the data access request and forwards the probe to local nodes associated with cache blocks 625 and 627 as well as to cache coherence controller 621-2.

It should be noted that although messages associated with requests, probes, responses, and data are described as forwarded from one node to another, the messages themselves may contain variations. In one example, alterations are made to the messages to allow the multiple cluster architecture to be transparent to various local nodes. It should be noted that write requests can be handled as well. In write requests, the targeted memory controller gathers responses and sends the responses to the processor when gathering is complete.

The cache coherence controller 641-1 associated with the remote cluster 640 receives a probe from cache coherence controller 621-2 and probes local nodes associated with cache blocks 645, 647, and 649. Similarly, the cache coherence controller 603-2 associated with the request cluster 600 receives a probe and forwards the probe to local nodes associated with cache blocks 605, 607, and 609 to probe the cache blocks in the request cluster 600. Processor 601-2 receives probe responses from the local nodes associated with cache blocks 605, 607, and 609.

According to various embodiments, cache coherence controller 621-3 accumulates probe responses and sends the probe responses to cache coherence controller 603-3, which in turn forwards the probe responses to the processor 601-3. Cache coherence controller 621-4 also sends a read response to cache coherence controller 603-4, which forwards the read response to processor 601-4. While probes and probe responses carry information for maintaining cache coherency in the system, read responses can carry actual fetched data. After receiving the fetched data, processor 601-4 may send a source done response to cache coherence controller 603-5. According to various embodiments, the transaction is now complete at the requesting cluster 600. Cache coherence controller 603-5 forwards the source done message to cache coherence controller 621-5. Cache coherence controller 621-5 in turn sends a source done message to memory controller 623-2. Upon receiving the source done message, the memory controller 623-2 can unlock the memory line and the transaction at the home cluster 620 is now complete. Another processor can now access the unlocked memory line.

It should be noted that because the cache coherence controller 621-3 waits for remote cluster probe responses before sending a probe response to cache coherence controller 603-3, delay is introduced into the system. According to various embodiments, probe responses are gathered at cache coherence controller 603-3. By having remote clusters send probe responses through a home cluster, both home cluster probe responses and remote cluster probe responses can be delayed at the home cache coherence controller. In one example, remote cluster probe responses have to travel an additional hop in order to reach a request cluster. The latency for transmission of a probe response between a remote cluster and a request cluster may be substantially less than the latency for transmission of a probe response between a remote cluster and a request cluster through a home cluster. Home cluster probe responses are also delayed as a result of this added hop.

As will be appreciated by one of skill in the art, the specific transaction sequences involving requests, probes, and response messages can vary depending on the specific implementation. In one example, a cache coherence controller 621-3 may wait to receive a read response message from a memory controller 623-1 before transmitting both a probe response message and a read response message to a cache coherence controller 603-3. In other examples, a cache coherence controller may be the actual processor generating the request. Some processors may operate as both a processor and as a cache coherence controller. Furthermore, various data access request messages, probes, and responses associated with reads and writes are contemplated. As noted above, any message for snooping a cache can be referred to as a probe. Similarly, any message for indicating to the memory controller that a memory line should be unlocked can be referred to as a source done message.

It should be noted that the transactions shown in FIG. 6 show examples of cache coherence controllers performing many different functions, including functions of remote processors, aggregate local caches, probing agent pairs, and remote memory as described with reference to FIGS. 5A-5D.

The cache coherence controller 621-1 at the home cluster 620 is acting as a remote processor. When the cache coherence controller receives a request from a request cluster processor, the cache coherence controller is directed to act as the requesting processor on behalf of the request cluster processor. In this case, the cache coherence controller 621-1 accepts a forwarded request from processor 601-1 and sends it to the memory controller 623-1, accumulates responses from all local nodes and the memory controller 623-1, and forwards the accumulated responses and data back to the requesting processor 601-3. The cache coherence controller 621-5 also forwards a source done to the local memory controller 623-2.

The cache coherence controller 603-1 at the request cluster 600 is acting as a remote memory. As remote memory, the cache coherence controller is designed to forward a request from a processor to a proper remote cluster and ensure that local nodes are probed. In this case, the cache coherence controller 603-1 forwards a probe to cache coherence controller 621-1 at a home cluster 620. Cache coherence controller 603-2 also probes local nodes 605, 607, and 609.

The cache coherence controller 641-1 at the request cluster 640 is acting as a probing agent pair. As noted above, when a cache coherence controller acting as a probing agent pair receives a probe from a remote cluster, the cache coherence controller accepts the probe and forwards it to all local nodes. The cache coherence controller accumulates the responses and sends a final response back to the request cluster. Here, the cache coherence controller 641-1 sends a probe to local nodes associated with cache blocks 645, 647, and 649, gathers probe responses and sends the probe responses to cache coherence controller 621-3 at home cluster 620. Similarly, cache coherence controller 603-2 also acts as a probing agent pair at a request cluster 600. The cache coherence controller 603-2 forwards probe requests to local nodes including local nodes associated with cache blocks 605, 607, and 609.

The cache coherence controller 621-2 and 621-3 is also acting as an aggregate remote cache. The cache coherence controller 621-2 is responsible for accepting the probe from the memory controller 623-1 and forwarding the probe to the other processor clusters 600 and 640. More specifically, the cache coherence controller 621-2 forwards the probe to cache coherence controller 603-2 corresponding to request cluster 600 and to cache coherence controller 641-1 corresponding to remote cluster 640. As noted above, using a multiple cluster architecture may introduce delay as well as other undesirable elements such as increased traffic and processing overhead.

Probes are transmitted to all clusters in the multiple cluster system even though not all clusters need to be probed. For example, if a memory line associated with a probe request is invalid or absent from cache, it may not be necessary to probe all of the caches associated with the various clusters. In a system without a coherence directory, it is typically necessary to snoop all clusters. However, by using a coherence directory, the number of transactions in the system can be reduced by probing only a subset of the clusters in a system in order to minimize traffic and processing overhead.

By using a coherence directory, global memory line state information (with respect to each cluster) can be maintained and accessed by a memory controller or a cache coherence controller in a particular cluster. According to various embodiments, the coherence directory tracks and manages the distribution of probes as well as the receipt of responses. If coherence directory information indicates that probing of a specific cluster is not required, the probe to the specific cluster can be eliminated. In one example, a coherence directory indicates that probing of requesting and remote clusters is not necessary. A cache coherence controller in a home cluster probes local nodes without forwarding probes to the request and remote clusters. The cache coherence controller in the home cluster then sends a response to the request cluster after probe responses are received. However, in typical multiple cluster systems, a requesting cluster expects a predetermined number of responses from the various probed clusters. In one example, if the multiple cluster system includes four clusters, a request cluster would expect probe responses associated with nodes in all four clusters.

In some examples, a completion bit associated with a probe response. The completion bit indicates to the requesting cluster that no other probe responses from other clusters should be expected. Any mechanism for notifying a request cluster that no other probe responses should be expected from other clusters is referred to herein as a completion indicator. In one example, a completion indicator is a completion bit included in the response sent to a request cluster after local nodes are probed. In another example, a completion indicator is separate data transmitted to a request cluster. By using a coherence directory and a completion indicator, the number of transactions associated with probing various clusters can be reduced. For example, with reference to FIG. 6, probes to cache coherence controller 603-2 and cache coherence controller 641-1 can be eliminated. A single response with a completion indicator can be transmitted by cache coherence controller 621-4 to the request cluster 600.

FIG. 7 is one example of a coherence directory that can be used to allow management and filtering of probes. Various coherence directories are available. In one example, a full directory provides an entry for every memory line in a system. In this example, the coherence directory is maintained at the memory controller and is accessible by a cache coherence controller. However, in a system with a large amount of system memory, a full directory may not be efficient or practical. According to various embodiments, a sparse directory is provided with a limited number of entries associated with a selected set of memory lines. In one example, the coherence directory 701 includes state information 713, dirty data owner information 715, and an occupancy vector 717 associated with the memory lines 711. In some embodiments, the memory line states are modified, owned, shared, and invalid.

In the invalid state, a memory line is not currently available in cache associated with any remote cluster. In the shared state, a memory line may be present in more than one cache, but the memory line has not been modified in any of these caches. When a memory line is in the shared state, an occupancy vector 717 can be checked to determine what cluster share the relevant data. An occupancy vector 717 may be implemented as an N-bit string, where each bit represents the availability of the data in the cluster of N clusters. Any mechanism for tracking what clusters hold a copy of the relevant memory line in cache is referred to herein as an occupancy vector. The memory line with address 741 is in the shared state, and the occupancy vector 717 indicates that clusters 1 and 3 each have a copy of the shared memory line in cache.

In the modified state, a memory line has been modified and the modified copy exists in cache associated with a particular cluster. When a memory line is modified, dirty data owner information field 715 can be checked to determine the owner of the dirty data. Any mechanism for indicating what cluster owns a modified copy of the memory line in cache is referred to herein as a dirty data owner information field. In one example, the memory line associated with address 781 is modified, and the dirty data owner field 715 indicates that cluster 2 owns the memory line.

In the owned state, a dirty memory line is owned by a single cache but may be resident in multiple caches. It has been modified by the owning cache, but the owning cache no longer has read-write privileges. In this case, the copy held in memory is stale. If the memory line is in the owned state, dirty data owner field 715 can be accessed to determine which cluster owns the dirty data. In one example, the memory line associated with address 761 is in the owned state and is owned by cluster 4. The occupancy vector 717 can also be checked to determine what other caches may have the relevant data. In this example, the occupancy vector 717 indicates that clusters 2, 3, and 4 each have a copy of the data associated with the memory line in cache.

Although the coherence directory 701 includes the four states of modified, owned, shared, and invalid, it should be noted that particular implementations may use a different set of states. In one example, a system may have the five states of modified, exclusive, owned, shared, and invalid. In the exclusive state, a memory line may be accessible to a particular node in a remote cluster, but the node in the remote cluster has not yet written data to the cache line. The techniques of the present invention can be used with a variety of different possible memory line states.

The coherence directory tracks the various transactions such as probe requests and responses in a multiple cluster system to determine when memory lines are added to the coherence directory, when memory lines are removed from the directory, and when information associated with each memory line is updated. By using the coherence directory, the techniques of the present invention recognize that the number of transactions such as probe requests can be reduced by managing or filtering probes that do not need to be sent to specific clusters.

FIG. 8 is a diagrammatic representation showing probe filter information that can be used to reduce the number of transactions in a multiple cluster system. Any criterion that can be used to reduce the number of clusters probed from a home cluster is referred to herein as probe filter information. Transactions such as probe requests can have a variety of characteristics. Some characteristics include whether the probe is a read block (read) 823 or a read block modify (read/write) 825. Other characteristics of the probe include the state of the memory line associated with the probe. In some examples, states include invalid 831, shared 833, owned 835, and modified 837. According to various embodiments, a coherence directory maintains information for memory lines in the local cluster that are cached in non-local clusters, where non-local clusters can include request and remote clusters.

If the state of the memory line associated with a probe is invalid 831 as indicated in the coherence directory, no copies of the memory line reside in other clusters. Consequently, only the home cluster needs to be probed and a completion bit can be used to indicate to a request cluster that the request cluster should expect only a single response from home cluster instead of a response from each of the clusters. If the memory line associated with the probe is in the shared state 833, and the transaction is a read transaction, only the home cluster needs to be probed and a completion bit can again be used to indicate to the request cluster that only a single response from home cluster should be expected as indicated in entry 803. It should be noted that the completed bit can not be used in entries 811 and 813.

For read transactions on owned memory lines, only the remote cluster with the line cached in the owned state needs to be probed. The remote cluster can transmit the response with a completion bit back to a request cluster. For transactions on modified memory lines, the probe can be sent to the remote cluster with the line cached in the modified state. Although transactions such as read block (read) and read block modify (read/write) are described, it should be noted that other transactions such as test and test and set are contemplated.

According to various embodiments, when the only cluster that needs to be probed is the home cluster, only the nodes in the home cluster are probed. No probes are transmitted to any request or remote cluster. However, when the only cluster that needs to be probed is a remote or request cluster, not only are the nodes in the remote cluster probed, but the nodes in the home cluster are probed as well. According to various embodiments, the techniques of the present invention provide that when only a remote or request cluster needs to be probed, the memory controller can sometimes be bypassed to allow probing of only the remote or request cluster. In one example, a probe is not forwarded to the home cluster memory controller and a probe is forwarded directly to the remote cluster from the home cluster cache coherence controller.

FIG. 9 is a diagrammatic representation showing exemplary memory controller filter information. Any criterion used to reduce the number of requests forwarded to a memory controller is referred to herein as memory controller filter information. Characteristics of a probe can again be analyzed when a cache coherence controller receives the probe from a request cluster. Transactions such as probe requests can have a variety of characteristics. Some characteristics include whether the probe is a read block (read) 923 or a read block modify (read/write) 925. Other characteristics of the probe include the state of the memory line associated with the probe. In some examples, states include invalid 931, shared 933, owned 935, and modified 937. When the state of the memory line associated with the probe is invalid 931, no remote probes are required because not remote clusters have a copy of the memory line in cache. The cache coherence controller also has no knowledge of the home cluster cache state. The probe is consequently forwarded to the memory controller.

For read block transactions on a shared memory line 903, there is no need to probe the remote clusters as the home cluster contains a valid copy of the memory line in either cache or the memory controller. Consequently the probe is forwarded to the memory controller. For read block modify transactions on shared memory lines 911, the local node state is unknown and the probe is sent to the memory controller.

For read block transactions on an owned memory line 905, there is no need to send a probe request to the target or probe local nodes as the owned state implies that the home cluster caches are invalid or shared. A probe is forwarded directly to the owning cluster to acquire the cached data. For read block write transactions on an owned memory line 913, the local state is unknown and consequently the request is forwarded to the memory controller. When the state of the memory line associated with the request is modified 937, there is no need to probe local nodes, as a modified state implies the home cluster state is invalid. A probe is forwarded to the cluster owning the memory line.

Techniques and mechanisms for reducing the number of probes and probe requests in a system by using a coherence directory along with probe filter information and memory controller filter information are described in U.S. patent application Ser. Nos. 10/288,347 and 10/288,399, both titled Methods And Apparatus For Managing Probe Requests by David B. Glasco and filed on Nov. 4, 2002, the entireties of which are incorporated by reference herein for all purposes.

A coherence directory can be used to filter unnecessary probes. However, in many instances, the coherence directory does not receive information on all changes in memory lines in remote caches. Consequently, the coherence directory can fill with stale data. In one example, a remote cache may cache a memory line and later replace the memory line in the cache without providing any information to various coherence directories in the system. Notification is not required to maintain coherency. The stale information results in unnecessary probing of remote clusters.

FIG. 10 is a table showing possible stale coherence directory information. The table shows coherence directory states in column 1001 and potential remote cache states in column 1003. The potential states of remote cache i are based on the directory state with owning clusters denoted as O occupancy vectors denoted as OV[i] for aggregate cache state in cluster i.

Entry 1021 indicates that a memory line in remote caches has a potential state of invalid when the corresponding memory line in a coherence directory has a state of invalid. The coherence directory state for the memory line is accurate. Entry 1023 indicates that one potential state for a memory line in a remote cache is shared when the directory state of the memory line is shared, with the remote cluster residing in the occupancy vector. Entry 1025 indicates that another potential state is invalid. An invalid remote cache state corresponds to the situation where a memory line in a remote cache was in the shared state, but was silently cast out of the remote cache and is now invalid. The coherence directory entry in this case is stale.

Entry 1027 indicates that one potential state for a memory line in a remote cache is owned when the directory state of the memory line is owned, with the remote cluster residing in the occupancy vector and set as the owning cluster. Entry 1029 indicates that another potential state for a memory line in a remote cache is shared when the directory state of the memory line is shared, with the remote cluster residing in the occupancy vector. Both entries 1027 and 1029 indicate accurate directory states. Entry 1031 indicates that another potential state is invalid. An invalid remote cache state corresponds to the situation where a memory line in a remote cache was in the shared state, but was silently cast out of the remote cache and is now invalid. The coherence directory entry in this case is stale. Stale data in a coherence directory leads to the inefficient distribution of probe requests in a computing system.

In one example, a probe request is transmitted to every cluster believed to have a shared copy of the memory line. However, some clusters believed to have a shared copy of the memory line based on stale data in a coherence directory may actually have the memory line in the invalid state. Consequently, the probe requests sent to the remote clusters with data in the invalid state are extraneous probe requests consuming valuable bandwidth and processing resources on the system. The techniques of the present invention provide mechanisms for reducing the amount of stale data in a coherence directory in order to make the management and distribution of probe requests more efficient.

Entry 1033 indicates that one potential state for a memory line in a remote cache is modified when the directory state of the memory line is modified, with the remote cluster set as the owning cluster. Entry 1033 indicates an accurate directory state. Entry 1035 indicates that another potential state for a memory line in a remote cache is invalid. An invalid remote cache state corresponds to the situation where a memory line in a remote cache was in the exclusive state, but was silently cast out of the remote cache and is now invalid. The coherence directory entry in this case is stale. It should be noted that other state combinations are possible. For instance, if the remote caches employ a different based protocol, a remote cluster may include an external remote data cache that follows a shared, exclusive, invalid (SEI) protocol.

When a processor cache receives a probe request, the cache typically determines if the associated memory line can be cached and updates the state according to the type of the probe. For example, the state may be updated based on whether the probe is a shared probe such as a read probe or an invalidating probe such as a read/write probe. The cache also generates a response.

FIG. 11 is a table showing information typically contained in a probe response. Column 1101 indicates that type of probe the response is applicable to. In one example, the response shown in FIG. 11 is generated for shared and invalidating probes. In one example, the cache state may be invalid, shared, owned, exclusive, or modified as shown in entries 1121, 1123, 1125, 1127, and 1129 for shared probes.

For invalidating probes, the cache state may be invalid, shared, owned, exclusive, or modified as shown in entries 1131, 1133, 1135, 1137, and 1139. However, the response may only contain information indicating the response type 1105 and whether the cache is retaining a shared copy of the memory line. In one instance, the response type 1105 indicates whether the memory line in cache is clean or dirty and if the memory line is shared. However, the information is not sufficient to determine with particularity the cache state. In one example, clean responses are either in the shared or exclusive states while dirty responses are either in the owned or modified states.

The mechanisms and techniques of the present invention contemplate providing additional information in a probe response to allow a receiver of the probe response to determine cache state. Any mechanism for passing information about the particular cache state in a remote cluster to a cluster originating the probe is referred to herein as an augmented probe response. It should be noted, however, that existing probes alter the state of the probe memory line in remote cache. For example, an invalidating probe such as a read/write probe changes the state of the memory line in remote cache to invalid. A shared probe may create a new state of invalid, shared, or owned. Consequently, the mechanisms and techniques of the present invention also contemplate introducing a probe that does not alter the state of the probed remote cache line. Any probe that does not change the state of the probed remote cache line is referred to herein as a non-change (NC) probe. In one example, the non-change probe is used exclusively to determine the state of the probed remote cache line to update a coherence directory.

FIGS. 12A-C are tables showing the information that can be contained in augmented probe responses for non-change probes, shared probes, and invalidating probes. Remote caches respond with a clean response if the line is in the shared or exclusive state in cache. A dirty response is provided if the line is in the owned or modified state in the cache as shown in columns 1205, 1235, and 1265. The O/M bit as shown in columns 1207, 1237, and 1267 is used to indicate if the line was in the owned or modified state prior to probing. The S/E bit as shown in columns 1209, 1239, and 1269 are used to indicate if the line was in the shared or exclusive state prior to probing. It should be noted that for non-change probes, the state prior to probing is the state subsequent to probing. The shared bit as shown in columns 1211, 1241, and 1271 is set to indicate if the cache has retained a shared copy of the memory line after probing. Shared and invalidating probe types also include new state information as shown in columns 1243 and 1273, providing information on the new state of the particular remote cache line. For example, a shared probe of a shared or exclusive remote cache line leads to a new state of shared.

The additional response information indicating if the memory line is in the O/M or S/E state can be used to maintain a more precise coherence directory state when remote clusters are probed. The coherence directory is typically maintained to provide a conservative view of remote cache states. For example, the coherence directory may indicate that a line is held shared in a remote cache when in fact the line is invalid in the remote cluster. The augmented probe responses allow a more complete view of state information in remote caches. It should be noted that a variety of mechanisms can be used to convey state information. In one example, a set of three bits can be used to convey a code corresponding to a particular cache state. In this example, O/M or S/E bits would not be needed. The three bit codes could instead be used to identify up to eight different states. In yet another example, a four-bit code could be used to identify which one of the 15 entries shown in FIGS. 12A-C is represented by the remote cache line. For example, a code of 0000 could represent entry 1221, while a code of 1110 could represent entry 1289.

Figure 13:
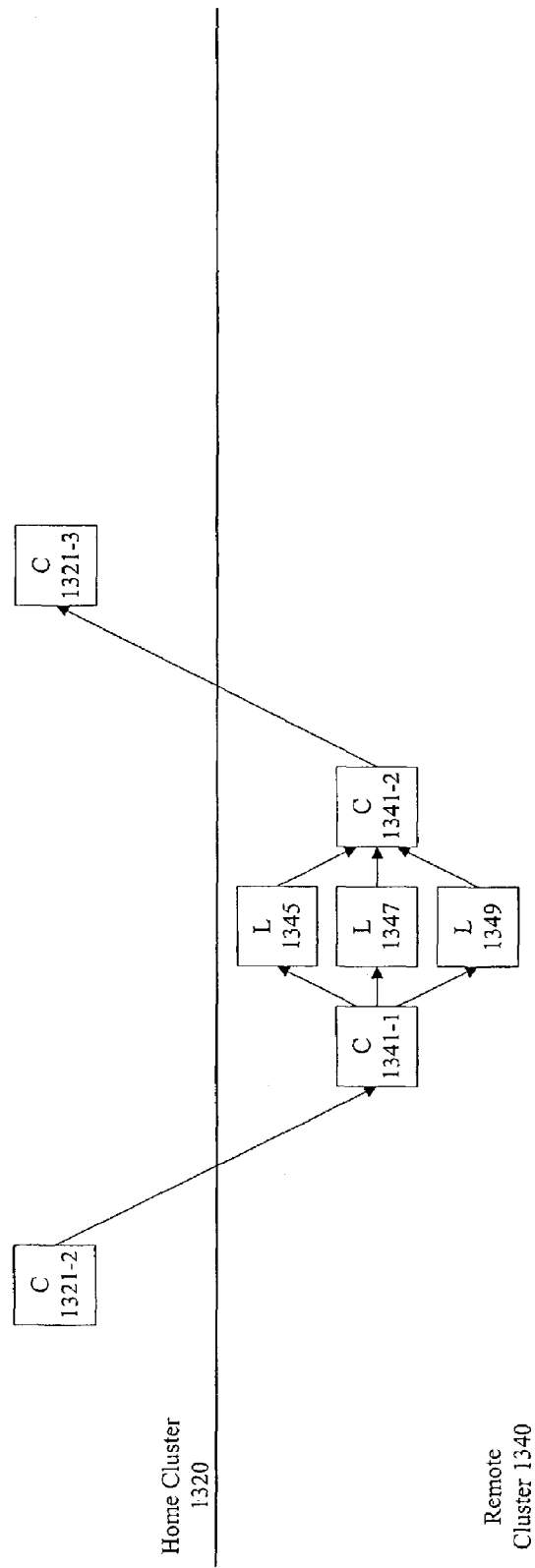
FIG. 13 is a diagrammatic representation showing use of a non-change probe.

FIG. 13 is a diagrammatic representation depicting a transaction using a non-change probe. A cache coherence controller 1321-2 in home cluster 1320 generates a non-change probe and sends the non-change probe to one or more remote clusters 1340. In one embodiment, non-change probes for a particular memory line are sent to every cluster noted in the corresponding occupancy vector in the coherence directory as having a shared copy of the memory line. According to various embodiments, the cache coherence controller 1321-2 blocks all other transactions that target the memory line being probed.

The cache coherence controller 1341-1 associated with the remote cluster 1340 receives a probe from cache coherence controller 1321-2 and probes local nodes associated with cache blocks 1345, 1347, and 1349. According to various embodiments, cache coherence controller 1341-2 accumulates probe responses from cache blocks 1345, 1347, and 1349 and sends an augmented probe response to cache coherence controller 1321-3 in home cluster 1320.

FIG. 14 is a table showing update actions that can be performed on a coherence directory entry upon receiving a particular augmented non-change probe response. For a memory line with a particular directory state 1403, actions 1407 including new state 1417 updates as well as occupancy vector and owning cluster updates 1419 are performed upon receiving an augmented response 1405 with dirty O/M information 1411, clean S/E information 1413, and cached or S-bit information 1415. As noted above, O/M information 1411 indicates if a memory line is in the owned or modified state, S/E information 1413 indicates if a remote cache line is in the shared or exclusive state, and S-bit information indicates if the remote cache is retaining a copy of the memory line.

If the memory line entry in the coherence directory is in the invalid state, no non-change probe needs to be sent, as the entry 1451 is already accurate. If the memory line entry is shared, several actions may be taken based on received non-change probe responses. According to various embodiments, non-change probes are sent to every cluster noted in the occupancy vector as having a cached copy of the memory line. If all probe responses received indicate that cached copies are maintained as shown by an S-bit 1415 for example, no change to the occupancy vector is performed at 1453. If some probe responses indicate that the associated clusters no longer have a cached copy, the associated clusters are removed from the occupancy vector as indicated in entry 1455. If no probe responses indicate that the associated clusters have a cached copy, the memory line directory state is set to invalid and the occupancy vector is cleared.

For coherence directory entries in the owned state, several actions may be taken based on received non-change probe responses from clusters noted in the occupancy vector. If the owning cluster non-change probe response has a dirty O/M bit 1411 set to owned and an S-bit 1415 set to cached, no change to the owning cluster parameter or the occupancy vector is made at 1461. If the owning cluster probe response comes back shared, the state of the memory line is updated to shared at 1463. The non-change probe responses from the other non-owning clusters are used to update the occupancy vector. Every non-change probe response with an S-bit 1415 set to cached is included in the occupancy vector. The probed cluster is in the invalid state and not the owned state at 1465.

Coherence directory entries in the modified state can lead to several different responses and resulting actions. If the owning cluster non-change probe response has a dirty O/M bit 1471 set to modified and an S-bit 1415 set to cached, no change to the owning cluster parameter or the occupancy vector is made at 1471. If the owning cluster non-change probe response has a clean S/E bit 1413 set to exclusive and an S-bit 1415 set to cached, the new state is set to modified as the cache can move to the modified state without notification. No change to the owning cluster parameter or the occupancy vector is made at 1473. If the owning cluster non-change probe response has a dirty O/M bit 1411 set to owned and an S-bit 1415 set to cached, the new state is set to owned but no change to the owning cluster parameter or the occupancy vector is made at 1475. If the owning cluster probe response comes back shared, the state of the memory line is updated to shared at 1477. If the non-change probe response returns with S-bits 1415 set to not cached, the entry in the coherence directory is updated to invalid at 1479.

Figure 15:
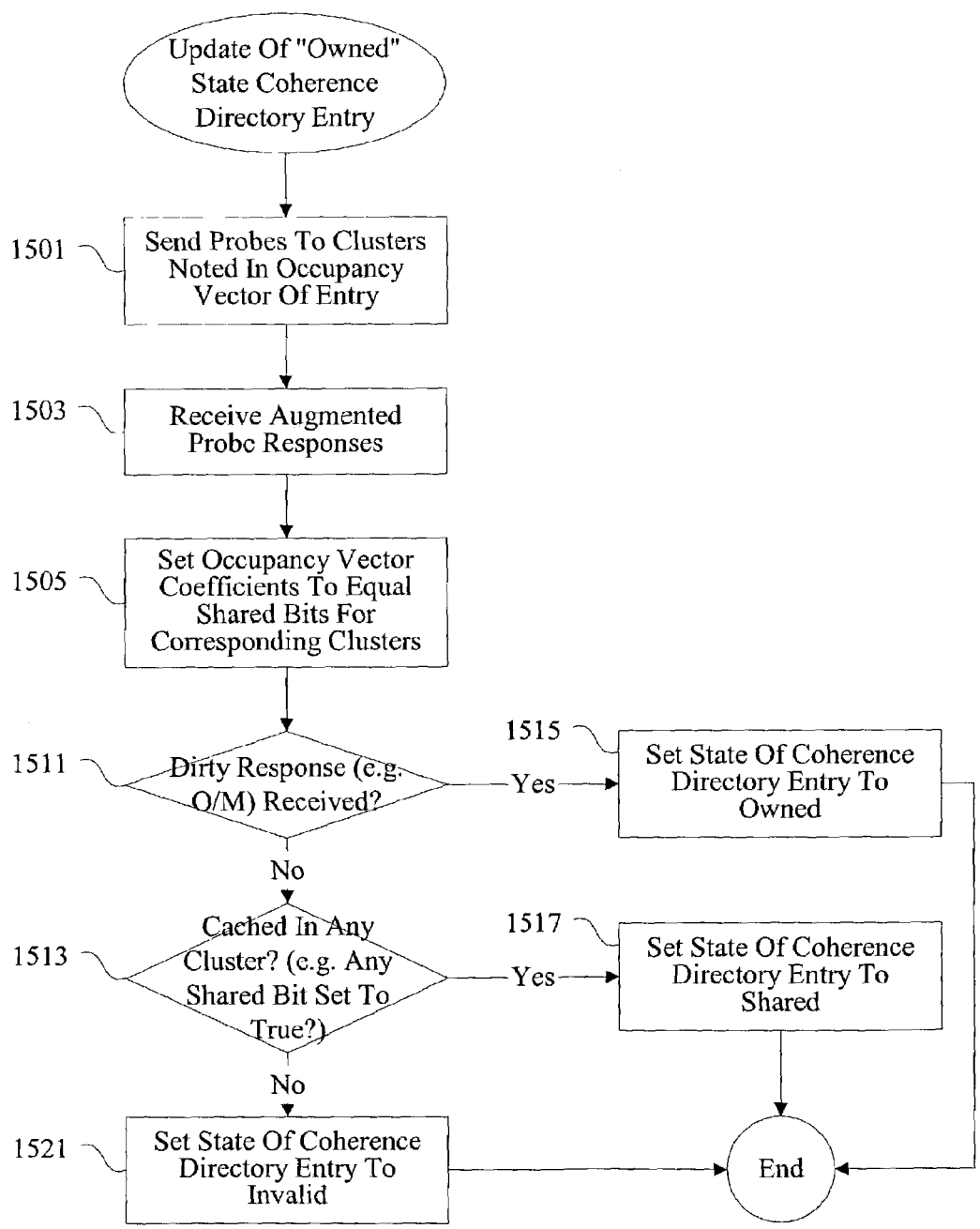
FIG. 15 is a flow process diagram showing techniques for updating a coherence directory owned state.

It should be noted that the coherence directory can be updated while probe responses are being received or after probe responses have been accumulated. FIG. 15 is a flow process diagram showing one example of updating a coherence directory entry in the owned state after probe responses are accumulated. At 1501, probes are sent to clusters noted in the occupancy vector associated with the coherence directory to be updated. At 1503, augmented probe responses are accumulated. According to various embodiments, occupancy vector coefficients are set to equal S-bits or cached bits for the corresponding clusters. At 1511, it is determined if a dirty response was received from the owning cluster. If a dirty response was received, the state of the coherence directory entry is set to owned at 1515. If no dirty response was received, it is determined at 1513 if the memory line is cached in any cluster. In one example, it is determined if any S-bit or cached bit is set to true. If a cached bit is set to true, the state of the coherence directory entry is set to shared at 1517. Otherwise, the state of the coherence directory entry is set to invalid at 1521.

A non-change probe provides a coherence directory with a mechanism for updating coherence directory entries without affecting the state of remote cache lines. The techniques of the present invention also provide mechanisms for updating coherence directory entries using conventional read and read/write probes. However, the actions taken for updating a coherence directory using conventional read and read/write probes varies depending on where the probe originates. For example, a shared probe originating from a request cluster entails adding the request cluster to an occupancy vector whereas a shared probe originating from the home cluster does not.

Figure 16:
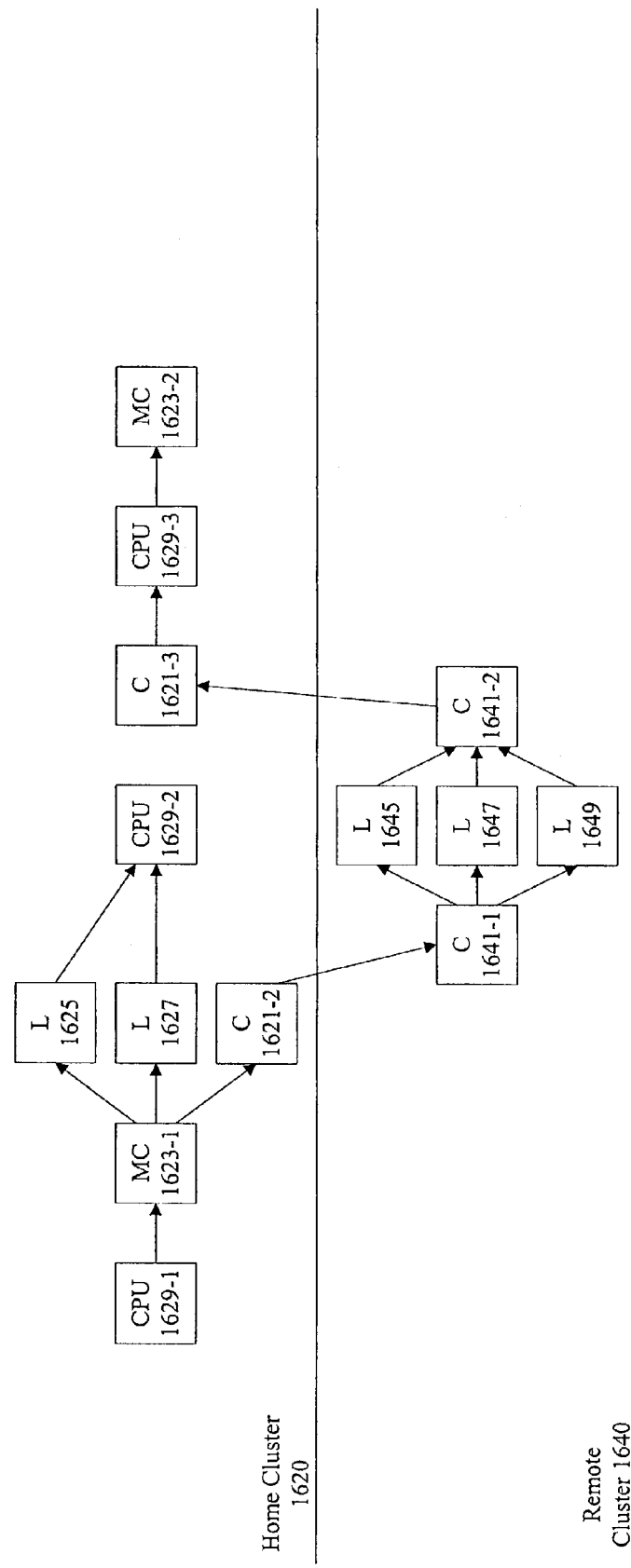
FIG. 16 is a diagrammatic representation showing a probe request generated by a home cluster.

FIG. 16 is a diagrammatic representation showing a transaction flow of probing from a home cluster, or a local to local transaction flow. According to various embodiments, processor 1629-1 in a home cluster 1620 sends a data access request such as a read or read/write request to a memory controller 1623-1. It should be noted that in some embodiments, the memory controller is integrated with a CPU. The memory controller 1623-1 locks the memory line associated with the request. In one example, the memory line is a unique address in the memory space shared by the multiple processors in the home cluster 1620 and the remote cluster 1640. The memory controller 1623-1 generates a probe associated with the data access request and forwards the probe to local nodes associated with cache blocks 1625 and 1627 as well as to cache coherence controller 1621-2.

The cache coherence controller 1641-1 associated with the remote cluster 1640 receives a probe from cache coherence controller 1621-2 and probes local nodes associated with cache blocks 1645, 1647, and 1649. Probe responses are sent to coherence controller 1641-2. While probes and probe responses carry information for maintaining cache coherency in the system, read responses can carry actual fetched data. Furthermore, cache coherence controller 1621-3 receives a probe response from the remote cluster 1640. The augmented read and read/write responses carry not only information such as fetched data, but also information for accurately updating a coherence directory to allow the filtering of unnecessary future probes. After receiving the augmented probe response from the cache coherence controller 1641-2, the coherence directory associated with the cache coherence controller 1621-3 is updated. Cache coherence controller 1621-3 in turn sends a probe response to the CPU 1629-3. After the CPU 1629-3 has received the requisite probe responses, a source done message is sent to the memory controller 1623-2. Another processor can now access the unlocked memory line.

FIG. 17 is a table showing update exemplary actions that are performed on a coherence directory entry upon receiving a particular augmented probe response originating from a local node. For a memory line with a particular directory state 1703, actions 1707 including new state 1719 updates as well as occupancy vector and owning cluster updates 1721 are performed upon receiving an augmented response 1705 with dirty O/M information 1711, clean S/E information 1713, and cached or S-bit information 1715. As noted above, O/M information 1711 indicates if a memory line is in the owned or modified state, S/E information 1713 indicates if a remote cache line is in the shared or exclusive state, and S-bit information indicates if the remote cache is retaining a copy of the memory line.

If the memory line entry in the coherence directory is in the invalid or shared state for a shared probe, no probe needs to be sent, as indicated by entries 1751 and 1753. Shared probes such as read probes are sent to a remote cluster containing dirty data. For coherence directory entries in the owned state, several actions may be taken based on received shared probe responses originating from a local node. If the owning cluster probe response has a dirty O/M bit 1711 set to owned and an S-bit 1715 set to cached, no change to the owning cluster parameter or the occupancy vector is made at 1761. If the owning cluster probe response comes back shared, the state of the memory line is updated to shared at 1763. If the probe response has an S-bit set to not cached, and if the occupancy vector is now empty, the entry in the coherence directory is updated to invalid at 1765. Otherwise, the entry remains shared.

For coherence directory entries in modified state, several actions may be taken based on received shared probe responses originating from a local node. If the owning cluster probe response has a dirty O/M bit 1771 set to modified and an S-bit 1715 set to cached, no change to the owning cluster parameter or the occupancy vector is made at 1761. However, the new state is set to owned. If the owning cluster probe response has a clean S/E bit 1713 set to exclusive and an S-bit 1715 set to cached, the new state is set to shared as the probed cluster is in the exclusive state. The memory line no longer has an owning cluster and the occupancy vector is set to include the probed cluster at 1773. If the owning cluster probe response has clean S/E bit 1713 set to shared and an S-bit 1715 set to cached, the new state is set to shared. The memory line no longer has an owning cluster and the occupancy vector is set to include the probed cluster at 1775. If the owning cluster probe response comes back not cached, the new state is set to invalid and the owning cluster and occupancy vector values are cleared at 1777.

For invalidating probes originating from a home cluster, a coherence directory entry in the invalid or shared state is updated to the invalid state at 1781. An entry in the owned or modified state is similarly moved to the invalid directory state at 1783.

Although probe requests may originate from a local node, probe requests can also originate from a request cluster. One example of a probe originating from a request cluster was shown earlier in FIG. 6. After a home cluster cache coherence controller receives a request from the request cluster and receives an augmented probe response from a remote cluster, a coherence directory in the home cluster is updated based on the information included in the augmented probe response.

FIG. 18 is a table showing update exemplary actions that are performed on a coherence directory entry upon receiving a particular augmented probe response originating from a request cluster. If the memory line entry in the coherence directory is in the invalid or shared state for a shared probe, no probe needs to be sent, as indicated by entries 1831 and 1833. However, because the request cluster now has a copy of the memory line, the occupancy vector is updated to include the request cluster and the new state is set as shared at 1831 and 1833. Shared probes such as read probes are sent to a remote cluster containing dirty data. For coherence directory entries in the owned state, several actions may be taken based on received shared probe responses originating from a request cluster. If the owning cluster probe response has a dirty O/M bit 1807 set to owned and an S-bit 1811 set to cached, no change to the owning cluster parameter is made at 1835. However, the occupancy vector is set to include the request as well as the probe clusters. If the owning cluster probe response comes back shared, the state of the memory line is updated to shared at 1837. If the probe response has an S-bit set to not cached, the occupancy vector is set to include the request cluster and exclude the probed cluster at 1839. The owning cluster parameter is cleared.

For coherence directory entries in modified state, several actions may be taken based on received shared probe responses originating from a request cluster. If the owning cluster probe response has a dirty O/M bit 1807 set to modified and an S-bit 1811 set to cached, no change to the owning cluster parameter is made at 1841. However, the occupancy vector is modified to include the request cluster and the new state is set to owned. If the owning cluster probe response has a clean S/E bit 1809 set to exclusive and an S-bit 1811 set to cached, the new state is set to shared as the probed cluster is in the exclusive state. The memory line no longer has an owning cluster and the occupancy vector is set to include the probed cluster as well as the request cluster at 1843. If the owning cluster probe response has a S-bit 1811 set to not cached, the new state is set to shared and the occupancy vector is modified to no longer include the request cluster. The memory line no longer has an owning cluster and the occupancy vector is set to include the request cluster at 1845.

For invalidating probes originating from a request cluster, no probe is transmitted. However, the coherence directory entry in the invalid state is updated to the modified-state at 1847. The owning cluster becomes the request cluster and the occupancy vector is set to include the request cluster. Invalidating probes originating from a request cluster cause all remote cluster caching the memory line to be proved. A coherence directory entry in the shared, owned, or modified state is set to modified and the occupancy vector is updated to include the request cluster. The owning cluster is set as the request cluster at 1849.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with multiple processor clusters connected through a point-to-point, switch, or bus architecture. In another example, multiple clusters of processors may share a single cache coherence controller, or multiple cache coherence controllers can be used in a single cluster. Therefore, the scope of the invention should be determined with reference to the appended claims.

What is claimed is:

1. A computer system, comprising:
a home cluster including a first plurality of processors and a home cache coherence controller associated with a coherence directory, the coherence directory having state information corresponding to home cluster memory lines cached remotely;
a remote cluster including a second plurality of processors and a remote cache coherence controller, the remote cache coherence controller configured to receive a non-change probe associated with a memory line from the home cluster and probe remote cluster nodes to obtain cache state information for the memory line, wherein the non-change probe is initiated by the home cluster cache coherence controller.

2. The computer system of claim 1, wherein the non-change probe is initiated by the home cluster cache coherence controller periodically to update the coherence directory.

3. The computer system of claim 1, wherein the non-change probe is initiated by the home cluster cache coherence controller when an occupancy vector in the coherence directory is above a predetermined size.

4. The computer system of claim 1, wherein the non-change probe is initiated by the home cluster cache coherence controller when a read request that does not require probing is received by home cache coherence controller.

5. The computer system of claim 1, wherein cache state information is included in an augmented probe response.

6. The computer system of claim 1, wherein cache state information includes an owned/modified indicator.

7. The computer system of claim 1, wherein cache state information includes a shared/exclusive indicator.

8. The computer system of claim 1, wherein cache state information includes a cached indicator.

9. The computer system of claim 1, wherein the first plurality of processors and the home cache coherence controller are interconnected in a point-to-point architecture.

10. The computer system of claim 1, wherein the second plurality of processors and the remote cache coherence controller are interconnected in a point-to-point architecture.

11. The computer system of claim 1, wherein the remote cluster cache coherence controller is operable to send the cache state information to the home cluster cache coherence controller.

12. The computer system of claim 11, wherein home cluster cache coherence controller is operable to update the coherence directory using the received cache state information.

13. The computer system of claim 12, wherein updating the coherence directory comprises updating the occupancy vector.

14. The computer system of claim 13, wherein the occupancy vector is set to include the remote cluster if the cache state information indicates that the memory line is cached.

15. The computer system of claim 13, wherein the occupancy vector is set to exclude the remote cluster if the cache state information indicates that the memory line is not cached.

16. The computer system of claim 11, wherein updating the coherence directory comprises updating the dirty data owner information field.

17. The computer system of claim 11, wherein the state of the memory line in the coherence directory is updated to invalid if the cache state information indicates that the memory line is not cached.

18. The computer system of claim 17, wherein the state of the memory line in the coherence directory is updated to shared if the cache state information indicates that the memory line in the remote cluster is shared and cached.

19. A method for probing nodes, the method comprising:
generating a non-change probe associated with a memory line at a home cluster having a coherence directory;
forwarding the non-change probe to a remote cluster, wherein the remote cluster is configured to receive the non-change probe and probe remote cluster nodes to obtain cache state information associated with the memory line, wherein the non-change probe is initiated by a home cluster cache coherence controller.

20. The method of claim 19, wherein the non-change probe is initiated by the home cluster cache coherence controller periodically to update the coherence directory.

21. The method of claim 19, wherein the non-change probe is initiated by the home cluster cache coherence controller when an occupancy vector in the coherence directory is above a predetermined size.

22. The method of claim 19, wherein the non-change probe is initiated by the home cluster cache coherence controller when a read request that does not require probing is received by home cache coherence controller.

23. The method of claim 19, wherein cache state information is included in an augmented probe response.

24. The method of claim 19, wherein cache state information includes an owned/modified indicator.

25. The method of claim 19, wherein cache state information includes a shared/exclusive indicator.

26. The method of claim 19, wherein cache state information includes a cached indicator.

27. The method of claim 19, wherein the first plurality of processors and the home cache coherence controller are interconnected in a point-to-point architecture.

28. The method of claim 19, wherein the second plurality of processors and the remote cache coherence controller are interconnected in a point-to-point architecture.

29. A coherence controller, comprising:
means for generating a non-change probe associated with a memory line at a home cluster;
means for forwarding the non-change probe to a remote cluster, wherein the remote cluster is configured to receive the non-change probe and probe remote cluster nodes to obtain cache state information associated with the memory line, wherein the non-change probe is initiated periodically to update the coherence directory.

30. The coherence controller of claim 29, wherein the non-change probe is initiated when an occupancy vector in the coherence directory is above a predetermined size.

31. The coherence controller of claim 29, wherein the non-change probe is initiated when a read request that does not require probing is received by home cache coherence controller.

32. The coherence controller of claim 29, wherein cache state information is included in an augmented probe response.

33. The coherence controller of claim 29, wherein cache state information includes an owned/modified indicator.

34. The coherence controller of claim 29, wherein cache state information includes a shared/exclusive indicator.

35. The coherence controller of claim 29, wherein cache state information includes a cached indicator.

36. A computer system, comprising:
a home cluster including a first plurality of processors and a home cache coherence controller associated with a coherence directory, the coherence directory having state information corresponding to home cluster memory lines cached remotely, wherein the home cache coherence controller receives a probe associated with a memory line from a home cluster processor;
a remote cluster including a second plurality of processors and a remote cache coherence controller, the remote cache coherence controller configured to receive a probe from the home cluster cache coherence controller and probe remote cluster nodes to obtain an augmented probe response for the memory line, wherein cache state information includes a shared/exclusive indicator.

37. The computer system of claim 36, wherein the augmented probe response comprises cache state information and probe response information.

38. The computer system of claim 37, wherein the probe from the home cluster is a shared probe associated with a read request.

39. The computer system of claim 37, wherein the probe from the home cluster is an invalidating probe associated with a read/write request.

40. The computer system of claim 37, wherein cache state information includes an owned/modified indicator.

41. The computer system of claim 37, wherein cache state information includes a cached indicator.

42. The computer system of claim 37, wherein the first plurality of processors and the home cache coherence controller are interconnected in a point-to-point architecture.

43. The computer system of claim 37, wherein the second plurality of processors and the remote cache coherence controller are interconnected in a point-to-point architecture.

44. The computer system of claim 37, wherein the remote cluster cache coherence controller is operable to send the cache state information to the home cluster cache coherence controller.

45. The computer system of claim 44, wherein home cluster cache coherence controller is operable to update the coherence directory using the received cache state information.

46. The computer system of claim 45, wherein updating the coherence directory comprises updating the occupancy vector.

47. The computer system of claim 46, wherein the occupancy vector is set to include the remote cluster if the cache state information indicates that the memory line is cached.

48. The computer system of claim 46, wherein the occupancy vector is set to exclude the remote cluster if the cache state information indicates that the memory line is not cached.

49. The computer system of claim 45, wherein updating the coherence directory comprises updating the dirty data owner information field.

50. The computer system of claim 45, wherein the state of the memory line in the coherence directory is updated to invalid if the cache state information indicates that the memory line is not remotely cached.

51. The computer system of claim 45, wherein the state of the memory line in the coherence directory is updated to shared if the cache state information indicates that the memory line in the remote cluster is shared and cached.

52. A method for probing cache lines, the method comprising:
receiving a probe request associated with a memory line from a local processor;
forwarding a probe associated with the probe request to a remote cluster of processors, wherein the remote cluster is configured to provide an augmented probe response, the augmented probe response having cache state information and probe response information for the memory line, wherein cache state information includes a shared/exclusive indicator.

53. The method of claim 52, wherein the probe is a shared probe associated with a read request.

54. The method of claim 52, wherein the probe is an invalidating probe associated with a read/write request.

55. The method of claim 52, wherein cache state information includes an owned/modified indicator.

56. The method of claim 52, wherein cache state information includes a cached indicator.

57. The method of claim 52, wherein the request cluster of processors are interconnected in a point-to-point architecture.

58. The method of claim 52, wherein the remote cluster of processors are interconnected in a point-to-point architecture.

59. A controller, the controller comprising:
means for receiving a probe request associated with a memory line from a local processor;
means for forwarding a probe associated with the probe request to a remote cluster of processors, wherein the remote cluster is configured to provide an augmented probe response, the augmented probe response having cache state information and probe response information for the memory line, wherein cache state information includes a shared/exclusive indicator.

60. A computer system, comprising:
a request cluster including a first plurality of processors and a request cache coherence controller, wherein the request cache coherence controller is configured to receive a request associated with a memory line from a request cluster processor and forward the request;
a home cluster including a second plurality of processors and a home cache coherence controller associated with a coherence directory, the coherence directory having state information corresponding to home cluster memory lines cached remotely, wherein the home cache coherence controller receives the forwarded request from the request cluster;
a remote cluster including a third plurality of processors and a remote cache coherence controller, the remote cache coherence controller configured to receive a probe associated with the memory line from the home cluster cache coherence controller and probe remote cluster nodes to obtain an augmented probe response for the memory line having cache state information and probe response information for the memory line, wherein cache state information includes a shared/exclusive indicator.

61. The computer system of claim 60, wherein the augmented probe response comprises cache state information and probe response information for the memory line.

62. The computer system of claim 61, wherein the probe from the home cluster is a shared probe associated with a read request.

63. The computer system of claim 61, wherein the probe from the home cluster is an invalidating probe associated with a read/write request.

64. The computer system of claim 61, wherein cache state information includes an owned/modified indicator.

65. The computer system of claim 61, wherein cache state information includes a cached indicator.

66. The computer system of claim 61, wherein the first plurality of processors and the request cache coherence controller are interconnected in a point-to-point architecture.

67. The computer system of claim 61, wherein the second plurality of processors and the home cache coherence controller are interconnected in a point-to-point architecture.

68. The computer system of claim 61, wherein the third plurality of processors and the remote cache coherence controller are interconnected in a point-to-point architecture.

69. The computer system of claim 61, wherein the remote cluster cache coherence controller is operable to send the cache state information to the home cluster cache coherence controller.

70. The computer system of claim 69, wherein the home cluster cache coherence controller is operable to update the coherence directory using the received cache state information.

71. The computer system of claim 70, wherein updating the coherence directory comprises updating the occupancy vector.

72. The computer system of claim 71, wherein the occupancy vector is set to include the request cluster.

73. The computer system of claim 71, wherein the occupancy vector is set to include the remote cluster if the cache state information indicates that the memory line is cached.

74. The computer system of claim 71, wherein the occupancy vector is set to exclude the remote cluster if the cache state information indicates that the memory line is not cached.

75. The computer system of claim 70, wherein updating the coherence directory comprises updating the dirty data owner information field.

76. The computer system of claim 69, wherein the state of the memory line in the coherence directory is updated to shared if the cache state information indicates that the memory line in the remote cluster is shared and cached.

77. A method for probing cache lines, the method comprising:
receiving a probe request associated with a memory line from a request cluster of processors;
accessing a coherence directory to identify a remote cluster for probing;
forwarding a probe associated with the probe request to the remote cluster of processors, wherein the remote cluster is configured to provide an augmented probe response, having cache state information and probe response information for the memory line, wherein cache state information includes a shared/exclusive indicator.

78. The computer system of claim 60, wherein the augmented probe response comprises cache state information and probe response information for the memory line.

79. The method of claim 78, wherein the probe is a shared probe associated with a read request.

80. The method of claim 78, wherein the probe is an invalidating probe associated with a read/write request.

81. The method of claim 78, wherein cache state information includes an owned/modified indicator.

82. The method of claim 78, wherein cache state information includes a cached indicator.

83. The method of claim 78, wherein the request cluster of processors are interconnected in a point-to-point architecture.

84. The method of claim 78, wherein the remote cluster of processors are interconnected in a point-to-point architecture.

85. A cache coherence controller, comprising:
  means for receiving a probe request associated with a memory line from a request cluster of processors;
  means for accessing a coherence directory to identify a remote cluster for probing;
  means for forwarding a probe associated with the probe request to the remote cluster of processors, wherein the remote cluster is configured to provide an augmented probe response, having cache state information and probe response information for the memory line, wherein cache state information includes a shared/exclusive indicator.

* * * * *